April 4, 1939.  F. RICKS ET AL  2,152,855

MACHINE FOR WORKING UPPERS OVER LASTS

Filed Sept. 8, 1937  8 Sheets-Sheet 2

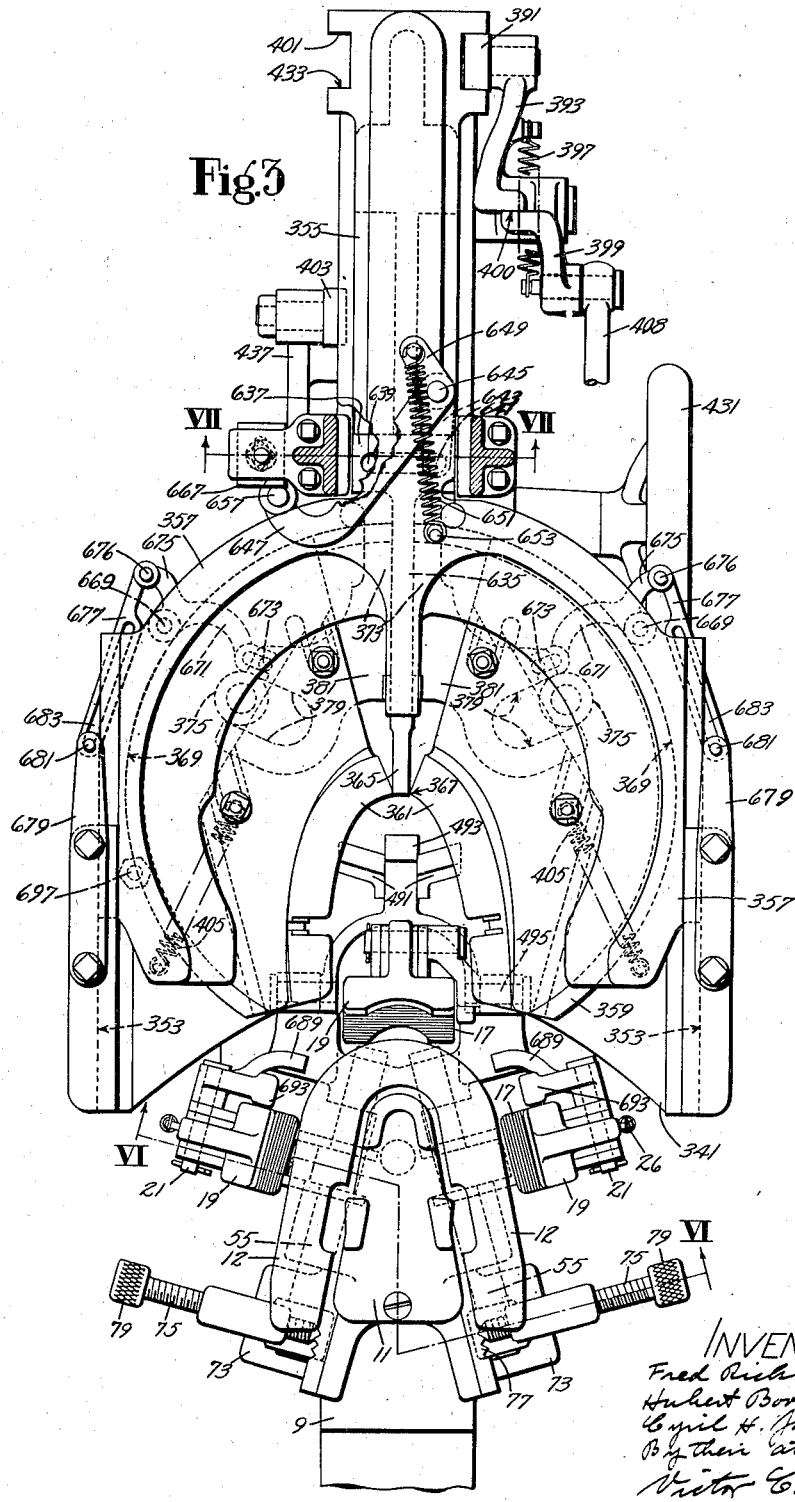

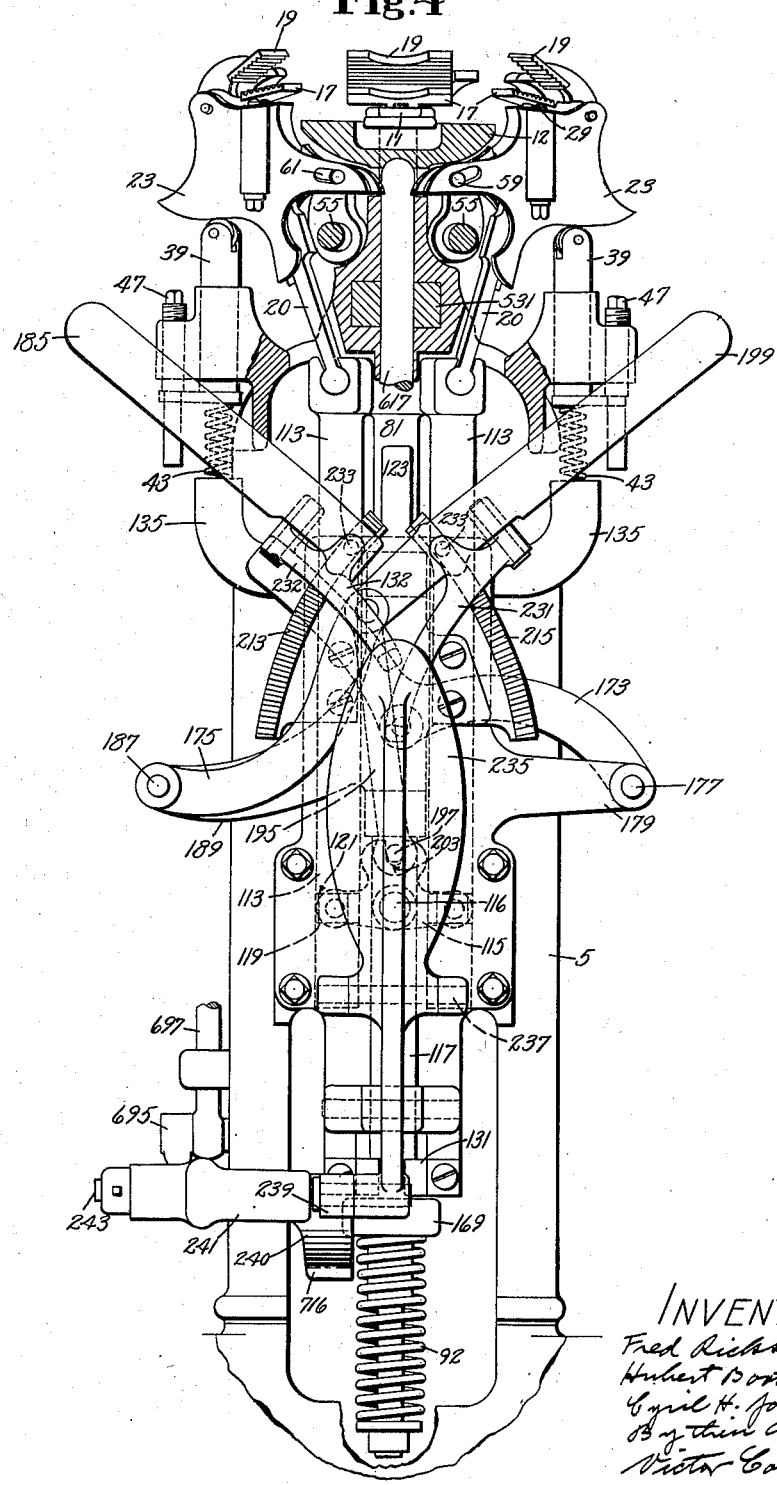

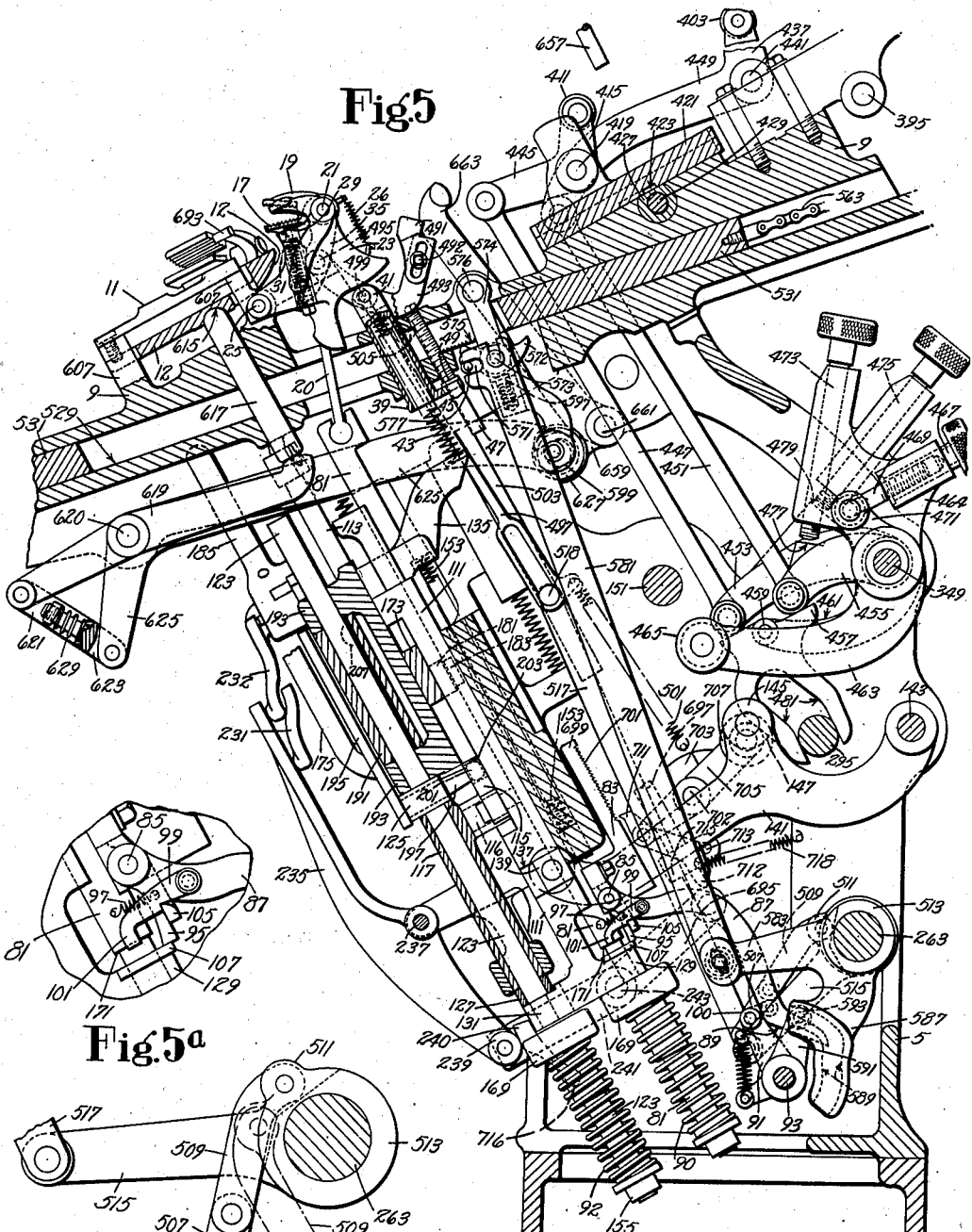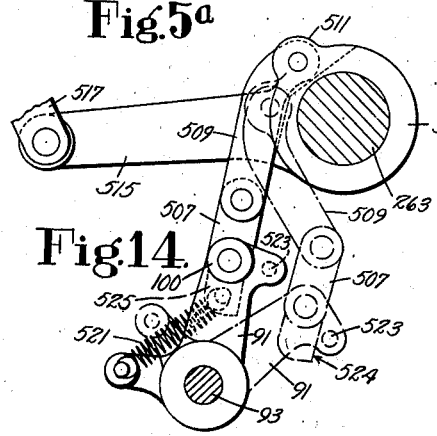

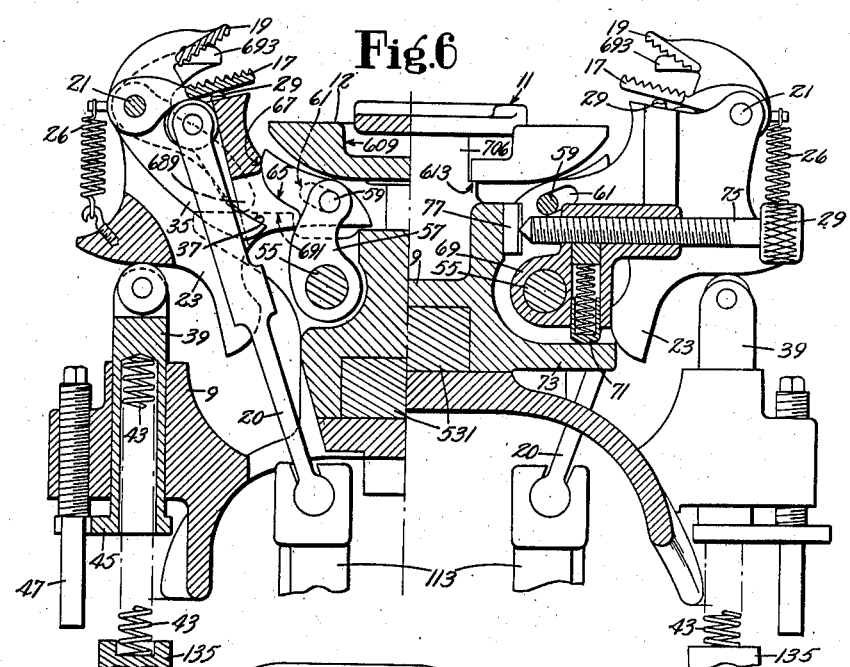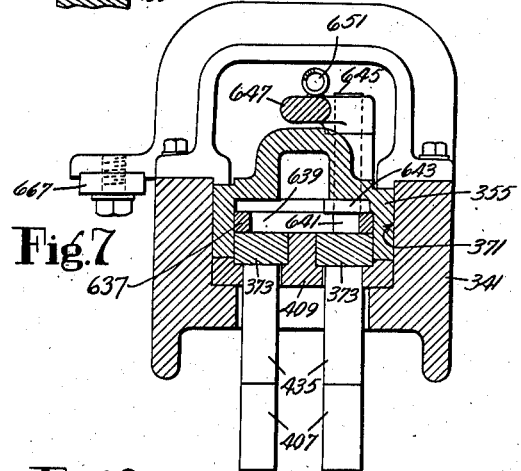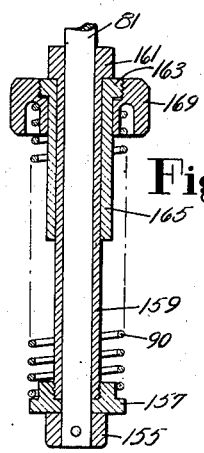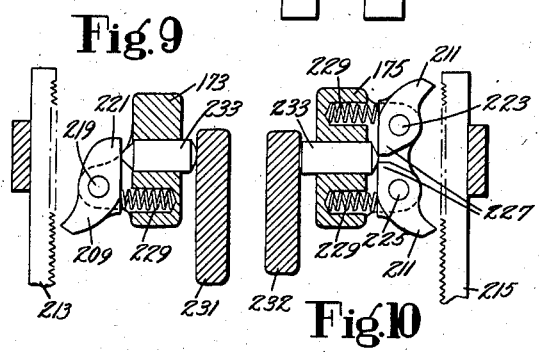

Patented Apr. 4, 1939

2,152,855

UNITED STATES PATENT OFFICE 2,152,855

MACHINE FOR WORKING UPPERS OVER LASTS

Fred Ricks, Hubert Boothroyd, and Cyril Harry James, Leicester, England, assignors to United Shoe Machinery Corporation, Paterson, N. J., a corporation of New Jersey Application September 8, 1937, Serial No. 162,890
In Great Britain October 3, 1936

66 Claims. (Cl. 12—10)

This invention relates to machines for working uppers over lasts and particularly to machines for pulling over and lasting stitchdown shoes.

Objects of the invention are to improve and perfect machines for this work without sacrificing any of the features and advantages of prior machines such as that disclosed in United States Letters Patent No. 2,096,761, granted October 26, 1937 upon application of Ricks and James.

The illustrated machine, which comprises a preferred embodiment of the invention, is provided with a support to receive the bottom of a shoe presented right side up and with toe and side grippers which are caused to be power operated to tension the upper downwardly and outwardly by manual means, for example a treadle, which is locked in depressed position, the machine coming to rest with the upper under tension. Hand levers are provided by which the tension of the toe gripper and the tension of the side grippers may be increased and the side gripper lever is movable in another direction to lessen the tension on one side of the shoe and increase it on the other. End-embracing wipers are mounted for bodily movement lengthwise of the shoe from a retracted position where they are out of operator's way to a position above the grippers and above the shoe toe and, in so moving, are opened to a predetermined but variable extent. Manual means, for example a second treadle, is provided to move the wipers into operative position above the shoe and then to cause power movement of the wipers heightwise of the shoe to shape the upper to the last and, after the heightwise movement is completed, to advance and close to tuck the upper under the last bottom, this being permitted because up to that time only the central portion of the forepart of the sole is supported. A peripheral support surrounding the central support is now raised by power through yielding means firmly to press the marginal portion of the sole and the outturned upper up against the wipers. At the same time an auxiliary wiper located between the end-embracing wipers is withdrawn, whereupon the machine comes to rest, at which time the operator may, if desired, secure the upper to the projecting margin of the sole by driving the fastenings through the notch provided by withdrawal of the auxiliary wiper and through notches in the end-embracing wipers located at opposite ends of the tip line.

In the illustrated machine, means is provided for causing the toe gripper to close before the side grippers are closed and to apply longitudinal tension to the upper before the transverse tension is applied, and, further, the toe gripper is released as the wipers advance to tuck the upper at the toe. Means operated by the wipers as they descend is provided to relieve the hold of the grippers on the upper so that they may give it up to the wipers to be thereby tucked under the shoe bottom.

To locate the shoe on the support, a V-shaped toe gage is brought into operative position before the grippers are operated and is withdrawn out of the way before the wipers reach their operative position. A rear abutment for the shoe is arranged to be drawn rearwardly by the operator against a weight and latched in a position away from the shoe. While the shoe is located by the toe gage, the rear abutment is released to engage the rear end of the shoe and is held during the wiping operation against movement away from the shoe and, during the advance of the wipers to tuck the upper under the last bottom, is moved by the heightwise movement of the wipers hard against the wipers at the toe.

In case the operation of the grippers upon the upper is unsatisfactory, the parts may be caused to resume their initial position by releasing the depressed gripper treadle, provision being made to prevent the second stop of the machine and cause it to perform its cycle in two steps instead of three. Means is provided for preventing upward movement of the gripper jaws until the wipers are lifted out of the way and various necessary and convenient adjustments are provided, for example the positions of the side grippers longitudinally of the shoe may be independently varied and also their positions laterally of the shoe. Means is provided for adjusting an abutment, which causes the wipers to open as they advance over the shoe, to vary the position of the wipers in accordance with the size of the shoe. The extent of both the closing movement and the advancing movement of the wipers by which the upper is tucked under the last bottom may be varied to suit different classes of work.

These and other features of the invention will appear more fully from the following description when read in connection with the accompanying drawings and will be pointed out in the appended claims.

In the drawings,

Fig. 3 is a plan view of the operating instrumentalities of the machine;

Fig. 4 is a front view, partly in section, of the grippers and their operating mechanism;

Fig. 5 is a sectional view taken from front to rear of the machine;

Figure 11:
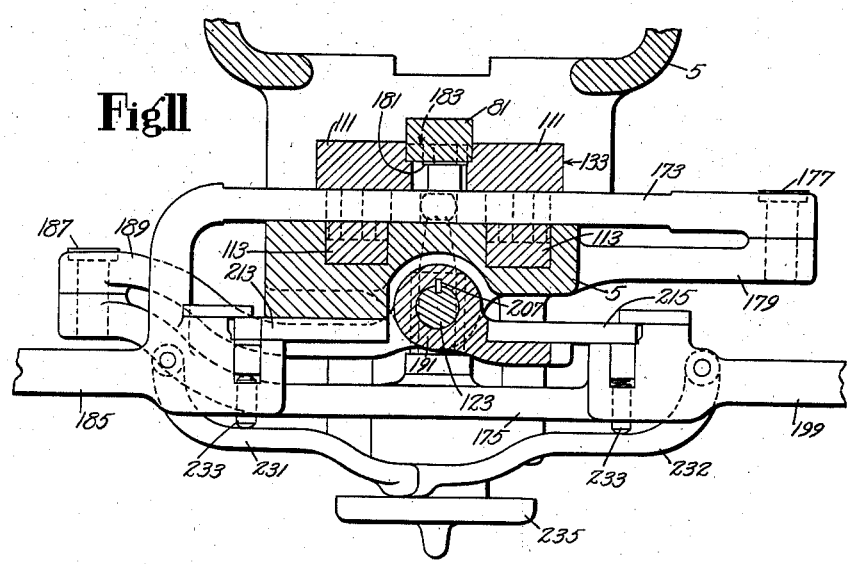
Figure 13:
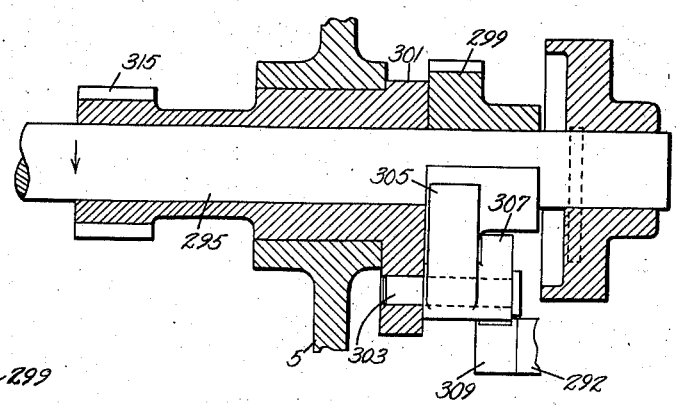
Figure 12:
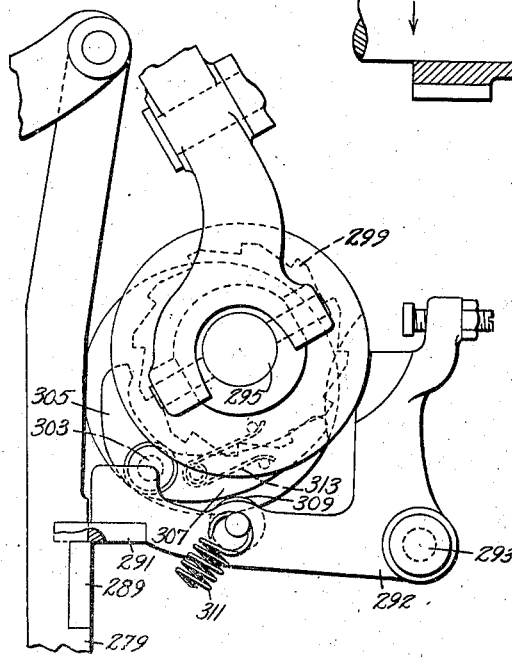
Figure 15:
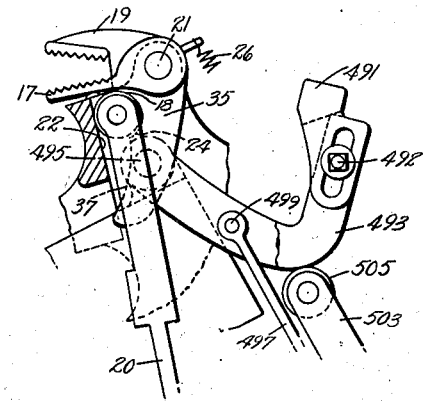

Fig. 5ᵃ is a detail view of parts shown in Fig. 5;

Fig. 6 is a sectional view taken on the line VI—VI of Fig. 3;

Fig. 7 is a sectional view taken on the line VII—VII of Fig. 3;

Fig. 8 is a sectional detail of parts shown in Fig. 5;

Figs. 9 and 10 are sectional details of the pawl mechanism for locking the hand levers;

Fig. 11 is a sectional plan view of the gripper-operating mechanism;

Fig. 12 is a side elevation of the clutch mechanism;

Fig. 13 is a sectional view of parts shown in Fig. 12;

Fig. 14 is a detail in elevation of parts shown in Fig. 5;

Fig. 15 is a detail of the toe gripper and toe gage shown in Fig. 5; and

Figure 16:
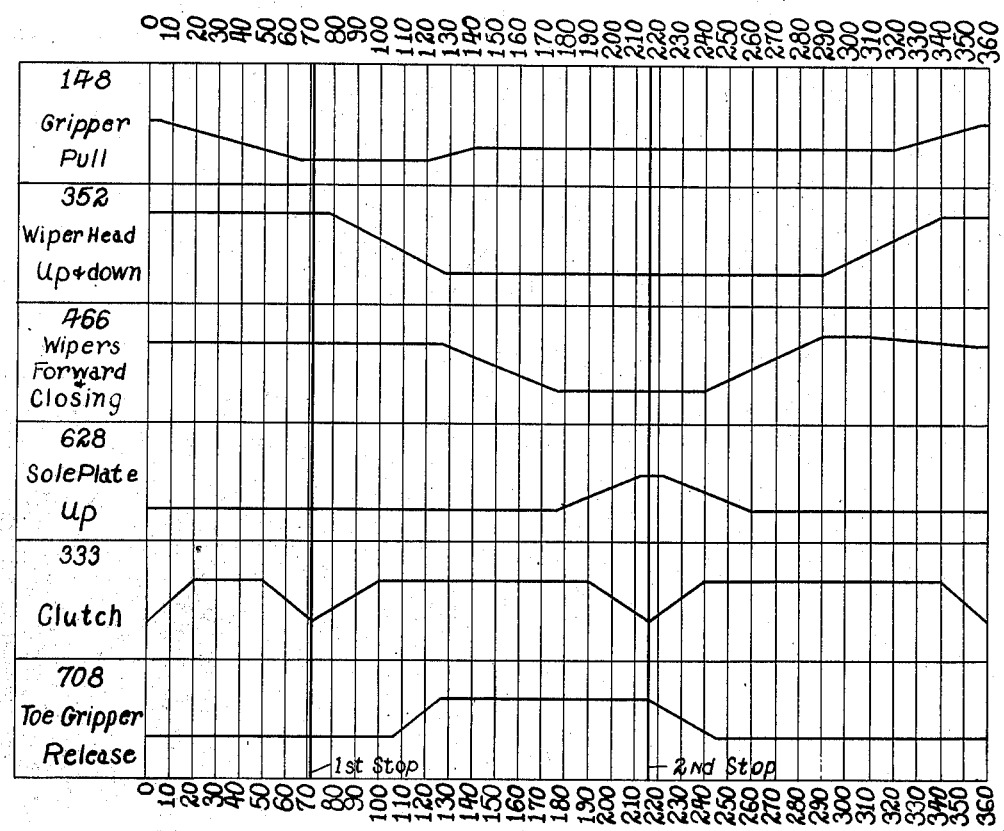

Fig. 16 is a cam chart of the machine.

The machine has a base 1 (Fig. 2) supported on two side members 3. On the base 1 are two substantially separate machines, which are identical except that the wipers of one machine are adapted for operating on left shoes and the other on right shoes, and the following description therefore applies to either machine. Each machine (Fig. 2) has a head 5 to which is secured an arm 7 which extends forwardly of the machine and is inclined upwardly from front to rear at an angle of approximately 20° to the horizontal. Near its forward end the arm 7 has secured on its upper face a member 9 on which is a shoe-supporting device (Fig. 1) comprising a central part 11 and a peripheral part 12. On the central portion the forepart of the sole of a stitchdown shoe is positioned right side up. The sole support 11, 12 extends rearwardly and upwardly at some 30° to the horizontal so that the forepart of a shoe supported thereon will be in a convenient position for the operator to watch the progress of the machine's operation on the toe portion of the shoe.

Each machine is provided with three upper grippers, one gripper (Fig. 5) being for pulling on the upper at the toe end and the other two grippers (Fig. 6) for pulling the upper at the opposite sides of the toe portion near the tip line. The toe gripper (Figs. 5 and 15) comprises a pair of jaws 17, 19 which are both mounted on a pivot 21, on a carrier plate 23 which in turn is pivoted on a pivot 25 on the member 9, the pivot 25 occupying a position below the sole-engaging face 11 of the shoe-supporting device and some distance heelward of the toe end of the surrounding portion 12. The pivot 21 when the toe gripper is open lies substantially in the same plane as the sole-engaging face 11. The lower jaw 17 of the toe gripper is formed by a short arm freely pivoted at 21. The jaws 17, 19 of the toe gripper are relatively wide in order that they may grip a substantial portion of the upper extending across the toe end of the last and may be wider than the side gripper jaws. The inner edges of the jaws of the toe gripper may, as seen in Fig. 3, be curved to simulate the contour across the toe end portion of the last so that the opposite side portions of the gripper jaws may engage the margin of the upper substantially as close to the last as do the central portions of the jaws.

The lower jaw 17 of the toe gripper (Fig. 5) rests near its forward end upon a plunger 29 housed in the carrier plate 23, the plunger being normally raised by a spring 31 beneath it which maintains the lower jaw 17 with its upper-engaging face a little above the sole-engaging face 11 of the shoe-supporting device, the forward ends of the toe gripper jaws then lying over the toeward end of the shoe-supporting device 12.

The upper jaw 19 of the toe end gripper is formed on the forward portion of one arm of a bell-crank lever which is freely pivoted at 21 and the other arm 35 of the bell crank lever extends downwardly from it. The forward face of the arm 35 of the bell crank lever is formed as a curved cam face 37 (Fig. 15). In order to swing the upper jaw 19 downwardly to clamp the margin of the upper against the lower jaw 17, a cam roll 18 engaging the curved cam face 37 on the arm 35 of the bell crank lever 34 is guided by a surface 22 on the carrier plate 23 for movement in a path substantially tangential to the pivot 21 of the bell crank lever and, by thus swinging the arm 35 of the bell crank lever rearwardly, moves the jaw 19 toward the jaw 17. The cam roll 18 is carried by the upper end of a ball-ended link 20 which, at its lower end, is connected to a gripper-operating slide which in turn is connected to power-operated mechanism hereinafter described.

In order that the upper jaw 19 may normally lie a substantial distance above the lower jaw 17 to facilitate the insertion of the upper margin between the jaws, the arm 35 of the bell crank lever has provided in the curved cam face 37 at its upper end a semicircular notch 24 opposite which the cam roll 18 is located when the parts are in their initial positions. When the cam roll 18 is opposite the notch the arm 35 of the bell crank lever is swung forwardly by a light spring 26 to raise the upper jaw 19 away from the lower jaw 17. Preferably the cam roll 18 moves up far enough to positively raise the upper jaw 19 by engagement with the upper edge of the notch 24.

The member 9 has beneath the rear end of the carrier plate 23 an upwardly extending bore in which is slidingly mounted a hollow plunger 39 (Fig. 5) carrying at its upper end a roll 41 on which the carrier plate 23 rests. A spring 43, supported at its lower end in a manner to be described, enters the hollow plunger 39 and urges it upwardly. To limit the upward movement of the plunger 39 by the spring 43, the plunger has at its lower end a fork 45 which embraces a rod 47 threaded into the member 9. The rod 47 has a collar or enlargement 49 above the fork 45 which serves to limit the upward movement of the plunger 39. By rotating the rod 47 the heightwise position of the gripper-carrying plate 23, and hence of the gripper jaws, relatively to the sole-supporting face of the shoe-supporting device may be determined and varied.

Downward movement of the cam roll 18, when the upper margin has been placed between the jaws, will first cause the roll 18 to ride out of the semicircular notch 24, thus moving the upper jaw 19 downward somewhat toward the lower jaw 17, and will then cause the upper jaw 19 to press the upper margin against the lower jaw 17. Since the lower jaw 17 is supported in a raised position by the spring plunger 29, the downward movement of the upper jaw 19 will first clamp the upper yieldingly against the lower jaw 17 but continued descent of the upper jaw will force the lower jaw down against the plunger 29 until the lower jaw rests upon the carrier plate 23, causing the jaws to clamp the margin of the upper positively and, when this has occurred, the continued descent of the cam roll 18 acts, through its wedging action between the curved cam face 37 on the bell crank lever arm 35 and the straight guiding face 22, to pull the carrier plate 23 downwardly about its pivot 25, the spring 43 acting on the plunger 39 being lowered by means hereinafter described so as not to offer increasing resistance to the pivotal movement of the carrier plate 23 about the center 25.

As the plate 23 swings downwardly about its pivot 25, the gripper jaws will move in an arcuate path, directed both rearwardly and downwardly, and will therefore, since they are then gripping the upper firmly between them, impart to the upper at the toe end thereof a tension directed both lengthwise of the shoe away from the toe end and heightwise toward the shoe bottom.

Each of the two side grippers (Fig. 6) comprises a carrier plate 23, jaws 17, 19 pivoted thereon, means for closing the jaws, and means for swinging the carrier plate 23 downwardly about its pivot which are similar to the corresponding parts above described of the toe gripper. The carrier plates for the side grippers are, however, pivotally supported in the following manner.

The member 9 (Figs. 3 and 4) which carries the shoe-supporting device 11, 12 has a pair of lugs projecting from each of its opposite sides, each pair providing bearings for a rod 55 which lies parallel to the sole-supporting face 11. The two rods 55 converge toward their rearward ends, as seen in Fig. 3, each rod lying at an angle of some fifteen degrees to a median line extending from front to rear of the machine. Each rod has secured on its between its supporting lugs a short upwardly extending arm 57 lying perpendicular to the axis of the rod 55 and a pivot 59 for the gripper-carrying plate 23 is secured in the upper end of the arm 57 (Fig. 6), the pin 59 lying parallel to the rod 55 at the same heightwise relation to the sole-supporting face 11 as the pivot 25 for the toe gripper. It is desirable that the side grippers shall move in a path which has a less component of outward movement than that of the toe gripper, and to this end the pivot pins 59 in the arms 57 support the side grippers by engagement with slots 61 in the side gripper-carrying plates 23, the pins 59, when the grippers are in their normally raised positions, lying at the innermost ends of the slots 61. Each arm 57 has at its upper end an outwardly projecting ear (Fig. 6) which has formed thereon a cam surface 65 which contacts with a rounded face 67 on the carrier plate 23. As the side grippers are first caused to close to grip an upper and then to descend in the same manner as the toe gripper, the rounded face 67 slides along the cam surface 65 and the pins 59 move along the slots 61 and so allow the gripper-carrying plates to move inwardly on their pivot pins 59, thus decreasing the component of outward movement imparted to the gripper jaws. The outer portion of each carrier plate for the side grippers is supported by a spring-pressed plunger 39 like that supporting the toe gripper and by reason of this arrangement the inner edge of the lower jaw of each side gripper is caused to occupy the same relation to the adjacent portion of the edge of the shoe-supporting device as does the forward edge of the lower jaw of the toe gripper, i. e., the edges of the lower jaws of all three grippers lie directly over the edge of the sole-supporting face 12 and are spaced upwardly away from it.

The side grippers are operated by power in the same manner as the toe gripper and, owing to the particular angular arrangement of the pivots 55, 59 for the carrier plates 23 of the side grippers, the side grippers move both outwardly away from the side of the shoe and lengthwise of the latter toward its toe end, the three grippers, of course, descending as they move in the directions indicated and the toe gripper moving also away from the shoe and lengthwise thereof.

The grippers of the illustrated machine diverge as they pull on the upper thus tensioning the toe portion of the upper tightly against the upper face of the last by pulling downwardly on it and hold the portions of the upper margin extending between adjacent grippers in such an outspread and stretched condition that no substantial wrinkles will remain therein. Moreover, the lengthwise tension imparted to the toe portion of the upper by the three grippers will draw the opposite sides of the shank portion of the upper closely against the sides of the last and thus assist in the obtaining of a well lasted shoe.

When the grippers have concluded their upper pulling action, the inner portions of the lower jaws of the three grippers will lie substantially in the same plane as the sole-supporting face 12 of the shoe-supporting device, the inner edges of the jaws lying close against the edge thereof. Therefore the toe portion of the upper will be held in tensioned condition with the portions gripped by the grippers lying slightly below the level of the upper face of the sole supported on the sole-supporting face 11, the upper margin therefore being presented in very convenient postion to be later pressed down, as a flange, against the outwardly extending margin of the sole by the wipers of the machine.

In the illustrated machine means is provided for adjusting the two side grippers independently forwardly and rearwardly in the machine relatively to the toe gripper so that each gripper may be positioned for engaging the uppers of shoes of different sizes or styles at the most appropriate place along the side of the shoe. For this purpose each of the rods 55 (Fig. 6) on which the carrier plates 23 for the side grippers are supported is slidable axially along the lugs in the member 9 and has fast on it a block 69 which has formed in its under side a short bore housing a downwardly extending spring-pressed plunger 71. This plunger bears, outwardly of the rod 55, on the upper face of a horizontal flange 73 extending from the member 9, and the block 69 has threaded through it a stem 75 which extends substantially horizontally. The inner end of the stem 75 is pointed and is caused by the spring plunger 71 to rotate the rod 55 and engage a rack 77 attached to the member 9 which rack extends parallel to the rod 55. Each of the stems 75 has a knurled head 79 and, by grasping this head and rocking the block 69 in a direction to compress the spring of the plunger 71, the pointed end of the stem 75 may be withdrawn from the rack 77 and the corresponding gripper-supporting rod 55 may be slid along its supporting lugs until the side gripper is positioned as desired. Release of the head 79 by the operator allows the pointed end of the stem 75 again to engage the rack 77 to retain the gripper in its adjusted position.

Rotation of the threaded stem 75 will move each side gripper angularly about its axis 55 and vary the distance apart of the side grippers as may be desired for a given shoe.

Better results are obtained by causing the toe gripper to commence its upper-pulling action before the side grippers begin to pull the upper. To this end, the illustrated machine is provided with means whereby, on depression of a treadle 80 to cause power actuation of the grippers, the upper jaw of the toe gripper is caused to close lightly on the upper before the side grippers are allowed to do so and, when the power-operated mechanism begins to act, the toe gripper imparts some tension to the upper after the jaws of the side grippers have closed but before the side grippers begin to pull the upper. For this purpose a gripper-operating slide 81 (Fig. 5) for the toe gripper has secured on it a bracket 83 on which is pivoted at 85 a downwardly extending arm 87 which, at its lower end, has formed on it a cam surface 89 arranged to contact with a roll 100 mounted at the far side of the upper end of an arm 91 fixed to a shaft 93 in the machine frame 5. The shaft 93 is arranged to be rocked in a clockwise direction as seen in Fig. 5 when the treadle 80 (Figs. 1 and 2) is depressed.

When the machine is at rest the gripper-operating slide 81 is supported in a raised position against the action of a spring 90, the arrangement of which is hereinafter described, by a depending latch 95 (Fig. 5ᵃ) pivoted on the pin 85, the latch being urged by a spring 97 in a clockwise direction as seen in that figure. Pivotally mounted on the arm 87 is a forwardly extending arm 99 having a downwardly turned end portion 101. The arm 99 has a latch face which, when the gripper-operating slide is in its raised position, lies in front of a projection 105 on the latch 95. When the treadle 80 is depressed and the arm 91 (Fig. 5) is swung in a clockwise direction, the roll 100 moves along the cam surface 89 on the downwardly extending arm 87 and swings the arm in a counterclockwise direction about the pin 85. This movement of the arm 87 causes the latch 95 to swing off from a plate 107, causing the gripper-operating bar 81 to be moved downwardly by its spring 90 an amount sufficient to cause the toe gripper jaws to close and lightly grip the margin of the upper. As the gripper-operating slide 81 descends, the downwardly turned end 101 of the arm 99 contacts with the plate 107, causing its latching face to be moved upwardly and out of contact with the projection 105 on the latch 95 to enable the lower end of the latch 95 to be pulled by the spring 97 over the upper face of the plate 107 when the gripper-operating bar 81 is again raised.

After the gripper-operating slide 81 has descended, a cam-operated slide 111 is pulled downwardly by power-operated mechanism and acts, through the spring 90 which surrounds the lower end of the gripper-operating slide 81, to cause the toe gripper to commence its upper-tensioning action. This movement also causes the upper jaws of the side grippers to descend toward their lower jaw and then causes them to begin their tensioning action.

In order that the side grippers may be closed upon the upper only after the cam-operated slide 111 has begun to move downwardly to impart an upper-tensioning movement to the already closed toe gripper, the following arrangement is provided. The two gripper-operating slides 113 (Fig. 4) for the two side grippers are connected near their lower ends to the opposite ends of a tension-distributing lever 115 which is pivoted at 116 midway between its ends on a sleeve 117 (Fig. 5) which extends parallel to the gripper-operating slides 113 and is positioned midway between them as seen from the front of the machine. The opposite ends of the tension-distributing levers 115 have small rectangular blocks 119 (Fig. 4) pivoted thereon which enter into horizontal slots 121 formed in the gripper-operating slides 113 transversely of the machine and provide the desired connection between the slides 113 and the lever 115. The sleeve 117 (Fig. 5) which carries the tension-distributing lever 115 is held against axial movement on an operating rod 123 by an enlargement 125 on the rod 123 above the sleeve and by a collar 127 secured on the rod 123 below the sleeve 117.

When the machine is at rest the collar 127 rests upon the upper face of a forwardly projecting bifurcated ear 131 of the cam-operated slide 111, then in its raised position, and the side gripper jaws are therefore maintained in an open condition. When, after the depression of the treadle 80, the gripper-operating slide 81 for the toe end gripper has been allowed to descend in the manner previously described and the cam-operated slide 111 commences to move downwardly, the gripper-operating slides 113 for the two side grippers begin to move. When the cam-operated slide 111 descends to close the gripper jaws of the side grippers, the slide 111 will, through a rearwardly projecting bifurcated ear 129 on which the plate 107 is secured, act through the spring 90 on the lower end of the operating slide 81 and cause the toe gripper to be operated. The operating rod 123 for the two side grippers has on its lower end a spring 92 similar to but stiffer than the spring 90 of the toe gripper. When, during the early portion of the downward movement of the cam-operated slide 111, the gripper-operating rod 123 begins to descend, the spring 92 on it also descends and by the time the upper jaws of the side grippers have reached the margin of the upper the toe gripper will have performed an appreciable upper-tensioning action, due to the fact that the toe gripper jaws had already been closed lightly to grip the margin of the upper when the slide 111 began to descend.

The cam-operated slide 111 is arranged to move along a guideway 133 (Figs. 5 and 11) formed in the frame 5 substantially beneath the mid-point of the shoe-supporting device 11 and perpendicular to its shoe-receiving face, the guideway extending parallel to the operating slide 81 for the toe gripper and to the operating rod 123 for the two side grippers, the operating slide 81 lying to the rear of the cam-operated slide 111 and the rod 123 lying in front of it. The cam-operated slide 111 (Figs. 4 and 5) has at its upper end three outwardly projecting lugs 135 each of which is directly beneath one of the carrier plates 23 for the toe and side grippers. In recesses in the upper faces of the lugs 135 rest the three springs 43 which act on the plungers 39 before described. This construction prevents increase in the upward pressure of the spring plungers 39 against the gripper carrier plates 23 as the latter are drawn downwardly by the descent of the cam-operated slide 111 and thus reduces the effort necessary to actuate the grippers. Near its lower end the cam-operated slide 111 has a slot 137 (Fig. 5) in which is housed a block 139 which is pivoted to the forward end of a cam-operated lever 141 which extends rearwardly and at its rear end is pivoted on a fixed shaft 143.

Between its ends this lever has an upwardly extending ear 145 which carries a cam roll 147 engaging a cam track 148 formed on a disk secured on a cam shaft 151. Compression springs 153 normally act to urge the slide 111 upwardly and serve to maintain the cam roll 147 in engagement with its cam track.

The track 148 for the roll 147 is so shaped (Fig. 16) that, when rotation of the cam shaft 151 commences, downward movement is imparted to the cam-operated slide 111 during an early portion only of the rotation of the cam shaft 151, e. g., while the cam shaft is rotating through about seventy degrees from its initial position. As previously indicated, downward movement of the cam-operated slide 111 serves to impart downward movement to the operating slide 81 of the toe gripper and to the operating rod 123 for the two side grippers by abutting against the springs 90, 92 located respectively on the lower end portions of the operating slide 81 and rod 123, the lower end portion of the operating slide 81 being also formed as a rod.

The two springs 90, 92 are similar except that the spring 92 for the two side grippers is much stronger than the spring for the toe gripper. The spring 92 may, for example, be substantially three times as strong as the spring 90 so that the side grippers exercise a stronger pull on the upper than the toe gripper, and each spring is arranged as shown in Fig. 8.

On the lower end of the rod 81 is pinned a collar 155 on which rests a collar 157 threaded on the lower end of a relatively long sleeve 159 extending upwardly along the rod. At its upper end the sleeve 159 has an enlarged head 161 against the under face of which a flange 163 formed on the upper end of a sleeve 165 surrounding the sleeve 159 is urged upwardly by the spring 90 bearing at is lower end on the collar 157 and at its upper end against a collar 169 threaded on the flange 163. By this construction the springs may be maintaianed under initial compression if desired.

The forwardly and rearwardly projecting bifurcated ears 129, 131 (Fig. 5) at the lower end of the cam-operated slide 111 embrace the heads 161 at the upper ends of the sleeves 159 on the operating slide 81 for the toe gripper and the operating rod 123 for the side grippers respectively and rest on the collars 169.

When the cam-operated slide 111 is moved downwardly by its cam, the bifurcated ears 129, 131 thereon abut against the collars 169 on the sleeves 165 and thereupon begin to pull the operating slide 81 and the rod 123 for the toe and side grippers yieldingly downward through the springs 90, 92.

The spring 90 of the slide 81 for the toe gripper is arranged when the machine is at rest to be compressed slightly when the operating slide 81 is held raised as before described by the latch 95. When, on depression of the treadle 80 and before the cam-operated slide 111 commences to move downwardly, the latch 95 is moved rearwardly from over the plate 107 as hereinbefore described, the toe gripper operating slide 81 is moved downwardly under the action of its spring 90 to cause the toe gripper jaws to close and lightly grip the margin of an upper previously placed between the jaws. The slide 81 moves downwardly until its movement is arrested by a shoulder 171 thereon abutting against the upper face of the rearwardly projecting bifurcated ear 129 on the lower end of the cam-operated slide 111. When, therefore, the cam-operated slide 111 later descends, it will allow the operating rod 123 for the side grippers to descend until the upper jaws 19 of the side grippers have closed. At the same time the slide 81 for the toe gripper will be pulled yieldingly downwardly by reason of the under face of the bifurcated ear 129 abutting against the collar 169 of the spring 90. As the cam-operated slide continues to descend under the action of its cam, it will act to pull the slide for the toe gripper downward and exert a tensioning action on the upper while the operating rod 123 for the side grippers moves downward to close the side gripper jaws. This insures that the toe end of the upper will be subjected to a lengthwise pull before the side grippers impart an outward pull to the adjacent side portions of the upper. The cam-operated slide 111 is drawn downwardly far enough during the first 70° of rotation of the cam shaft 151 so that when it stops the three grippers will all be imparting outward and downward tension to the upper.

It may sometimes be desired to supplement the strain imparted to the upper by the power-operated gripper mechanism and for this purpose the illustrated machine is provided with a pair of hand levers 173, 175 (Fig. 4) which the operator may depress to move the grippers farther downwardly. The hand lever 173 (Fig. 11) extends laterally of the machine across the front of the operating slide 111 and this lever is pivoted at 177 to a bracket 179 fixed to the head 5. Between its ends the lever 173 has a block 181 pivoted on it which extends into a transverse slot 183 formed in the operating slide 81 for the toe gripper 13. The left-hand end of the lever (Fig. 4) is formed as a handle 185 accessible to the operator's left hand and, by depressing the handle 185, the gripper-operating slide 81 may be forced farther downwardly to increase the tension of the toe gripper.

The other lever 175 (Figs. 4 and 11) passes transversely of the machine, across the forward side of the operating rod 123 for the two side grippers 15. The left-hand end of this lever 175 is pivoted at 187 to an arm 189 extending toward the left from a sleeve 191 (Fig. 5) which surrounds a portion of the side gripper operating rod 123 and is held against axial movement by abutting at its opposite ends against lugs 193 formed on the machine frame. About midway of its length (Fig. 4) the hand lever 175 has the upper end of a depending link 195 pivoted to it, the lower end of which is pivoted on a pin 197 extending, forwardly and rearwardly of the machine (Fig. 5), through a bore in the enlarged portion 125 of the gripper-operating slide 123. The right-hand end of the said hand lever 175 is formed as a handle 199 (Fig. 4) convenient to the operator's right hand and, by depressing this handle, the rod 123 may be urged farther downwardly, thus, through the tension-distributing lever 115 to which the operating slides 113 for the two side grippers 15 are secured, drawing the two side grippers 15 farther outwardly and downwardly.

The operator may also desire to increase the tension applied to one side of the upper by one of the side grippers and simultaneously to decrease the tension applied to the opposite side of the upper by the other side gripper if he observes that, when the grippers have concluded their power-operated upper-tensioning movements, the toe portion of the upper needs to be moved bodily widthwise across the upper face of the last. For this purpose the pin 197 (Fig. 5) is extended rearwardly from the rod 123 and its rear end is formed as a ball 201 which lies within an upwardly directed slot 203 formed in the tension-distributing lever 115 directly over its pivot 116. The sleeve 191 may be rotated about its axis by forward and rearward movement of the handle 199 and the sleeve 191 is splined by a key 207 to the rod 123. If, therefore, the operator pulls the handle 199 of the hand lever 175 forwardly or pushes it rearwardly, the rear end of the ball-ended pin 197 engaging in the slot 203 in the tension-distributing lever 115 will move toward the right or left of the machine and will therefore rock the tension-distributing lever 115 in one direction or the other about its pivot. Thus one of the side grippers will be pulled farther downward and outward while the other side gripper will be caused to rise and to move inwardly an equal distance.

The hand lever 173 has pivoted on it a pawl 209 (Fig. 9) and the hand lever 175 has pivoted on it, one above the other, a pair of pawls 211 (Fig. 10) which are arranged at a certain time during the operation of the machine to engage with arcuate racks 213, 215 (Fig. 4). The arcuate rack 213 with which the pawl on the hand lever 173 associated with the toe gripper cooperates is fixed on the frame but the rack 215 with which the pawls on the hand lever 175 cooperate is fixed on the sleeve 191 which is keyed to the operating rod 123 for the side grippers so that the rack 215 will retain its correct relation to the hand lever 175 when swung forwardly or rearwardly for the purpose above indicated.

The pawl 209 on the hand lever 173 (Fig. 9) extends downwardly from its pivot 219 and has an upwardly extending tail 221. The pawls 211 (Fig. 10) on the hand lever 175 extend in opposite directions from their pivots 223 and 225 so the tails 127 of the pawls are between the pivots. Springs 229 located in recesses in each hand lever tend to urge the pawls 209, 211, 211 into engagement with their racks 213, 215. To insure that the pawls will be disengaged from their racks when the cam-operated slide 111 descends, each of the two hand levers is provided (Fig. 4) with a pivoted arm one of which, 231 (Fig. 9), extends across the forward end of a pawl-releasing plunger 233 mounted in the hand lever 173 opposite the tail of the pawl 209 and the other, 232 (Fig. 10), across the pawl-releasing plunger 233 mounted in the hand lever 175 opposite the tails 227 of the pawls 211, 211.

The two arms 231, 232 extend downwardly side by side and lie behind a single upstanding pawl-releasing lever 235 (Figs. 4 and 5) which is pivoted between its ends on a fixed pivot 237. Below its pivot 237 the pawl-releasing lever 235 has a downwardly extending arm at the lower end of which is a roll 239 which is engaged by a cam face 240 on the forward end of a lever 241 pivoted at 243 on the machine frame 5. During operation of the grippers the roll 239 is held forward by the cam face 240 which presses the upper portion of the pawl-releasing lever 235 rearwardly against the two arms 231, 232 on the two hand levers 173, 175 and causes the pawl-releasing plungers 233 to hold the pawls 221, 211, 211 out of engagement with the racks 213, 215 so that the grippers will be operated as described upon descent of the cam-operated slide 111. Operation of the lever 241 to release the pawls at the proper time will be later explained.

Figure 2:
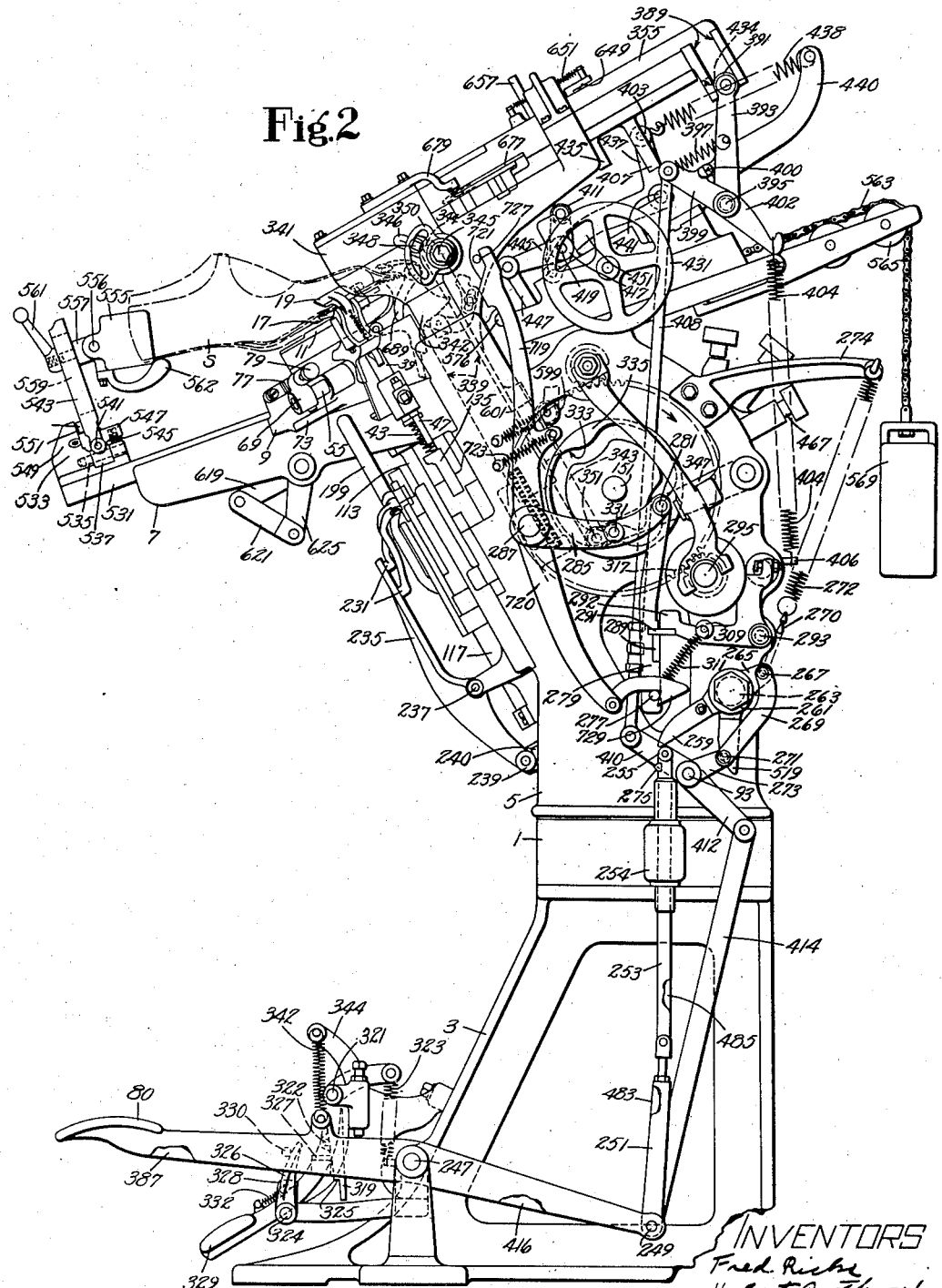
Fig. 2 is an elevation of the right-hand side of the machine.

The mechanism by which a depression of the treadle 80 first causes operation of the gripper jaws will now be described. The treadle 80 (Fig. 2) is pivoted between its ends on a rod 247 and its rear end has pivoted to it at 249 the lower end of a link 251 which is pivoted at its upper end to a vertical rod 253 arranged for lengthwise sliding movement in a bearing 254 on the frame. Upward movement of the rod 253 due to depression of the treadle 80 allows the upper gripper jaw 19 of the toe gripper to descend upon the work as described and throws in a clutch for rotating the cam shaft 151 of the machine through the following arrangement. To allow the upper gripper jaw 19 to descend the arm 91 (Fig. 5) carrying the roll 100 which engages the cam surface 89 on the downwardly extending arm 87 is turned in a clockwise direction by engagement of a roll 255 on the upper end of the rod 253 (Fig. 2) with the forward end of a finger 259 extending from a sleeve 261 which is freely mounted on a shaft 263 parallel to the cam shaft 151. The sleeve 261 has a lug 265 projecting rearwardly from it to which is pivoted at 267 the upper end of a curved link 269 the lower end of which is pivoted at 271 to a short arm 273 secured on the shaft 93. Rising of the rod 253, therefore, will cause the sleeve 261 to turn in a clockwise direction as seen in Fig. 2 and, through the curved link 269, will cause the arm 91 (Fig. 5) to swing rearwardly and operate the lever 87 to release the latch 95, thus allowing the upper jaw of the toe gripper to descend as described. Counterclockwise movement of the sleeve 261, when released, is insured by a chain 270 wrapped about the sleeve and held under tension by a spring 272 attached to a bracket 274.

To throw in the clutch after the toe gripper has closed, the rod 253 has a V-shaped block 275 thereon (Fig. 2) which, as the rod is nearing the upper limit of its movement, engages a pin 277 projecting transversely from the lower end of a latching lever 279 and moves it forwardly. The upper end of the latching lever 279 is pivoted at 281 to the rear end of a cam lever 285 which at its forward end is pivoted on a fixed shaft 287. Near its lower end the latching lever 279 has a shoulder 289 projecting rearwardly from it and, when the machine is at rest, a forked block 291 on the forward end of a clutch-tripping lever 292 rests upon this shoulder 289 with the arms of the fork embracing the lever 279. The clutch-tripping lever 292 is pivoted at its rear end on a shaft 293. Above the clutch-tripping lever 292 is a countershaft 295 which extends parallel to the cam shaft 151 and has a gear 296 meshing with a gear 298 on a main shaft 297 (Fig. 1), the shaft 295 being driven at some 120 revolutions per minute. The countershaft 295 has a ratchet wheel 299 (Figs. 12 and 13) secured to it and has a sleeve member 301 freely rotatable thereon. The sleeve member 301 carries, on a pivot 303 parallel to the shaft 295, a pawl 305 which, when allowed to engage the ratchet wheel 299, causes the sleeve member 301 to rotate with the shaft.

When the machine is at rest (Fig. 12) with the block 291 on the forward end of the clutch-tripping lever 281 resting on the shoulder 289 of the latching lever 279, a tail 307 on the pawl 305 is urged upward to hold the nose of the pawl 305 out of engagement with the ratchet wheel 299 by a roll 309 on the clutch-tripping lever 292. When the rod 253 (Fig. 2) approaches the upper limit of its movement, the V-shaped block 275 engages the pin 277 in the lower end of the latching lever 279 and swings the latter far enough toward the front of the machine to remove its shoulder 289 from beneath the block 291 on the forward end of the clutch-tripping lever 292 and allows the lever to be pulled downwardly by a spring 311 which is connected at its other end to the pin 277 and urges the latching lever rearwardly. As the lever 292 moves down, a spring 313 (Fig. 12) swings the pawl 305 into engagement with the ratchet wheel 299 and therefore couples the sleeve member 301 to the countershaft 295 for rotation therewith. The sleeve member 301 has a pinion 315 formed integrally with it which meshes with gear teeth 317 (Fig. 2) formed on the disk 149 fixed on the cam shaft 151 which it rotates through a five-to-one reduction.

The cam shaft 151 starts to rotate and the power-operated gripper mechanism begins to act approximately when the rod 253 reaches the upper limit of its movement. The rod 253 is held up with the V-shaped block 275 above the pin 277 by a depending latch 319 (Fig. 2) pivoted on a transverse rod 321 above the treadle and urged forwardly by a tension spring 323 so that a shoulder 325 on it rides over a face 327 on the forward arm of the treadle 80 when it is fully depressed. A latch-releasing pedal 329 is fixed on the rod 321, and to a rearwardly extending arm of the pedal 329 is secured the upper end of the spring 323. By depressing the pedal 329 when it is desired to cause the rod 253 to fall, the rod 321 is rocked to move the shoulder 325 on the depending latch 319 rearwardly from the face 327 on the treadle 80 and the treadle is raised by a spring 342 the upper end of which is secured to a fixed arm 344.

The lever 285 (Fig. 2), which supports the latching lever 279, has a cam roll mounted on its inner face on a pin 331 about midway of its length, which roll enters a track 333 formed in a cam 335 on the cam shaft 151. When the cam shaft 151 starts to rotate, the cam lever 285 is first lowered about its pivot 287 to cause the shoulder 289 on the latching lever 279 to descend below the block 291 on the lowered clutch-tripping lever 292 and when the cam shaft 151 has turned through about 70° is lifted to cause the shoulder 289 to engage the block 291 on the clutch-tripping lever 292 and raise the lever (Fig. 12) so that the roll 309 thereon will engage the tail 307 and disengage the pawl 305 from the ratchet wheel 299. The machine then comes to rest while the grippers are holding the upper under tension.

The illustrated machine is provided (Fig. 3) with a pair of wipers which are arranged, while the three grippers are holding the upper in a tensioned and outspread condition, to move forwardly over and then downwardly around the toe portion of the last to shape the upper thereto and, having descended to a position in which their under faces lie at least in the same plane as the last bottom, to advance and close somewhat to force the upper well into the angle between the side of the last and the outwardly projecting margin of the sole to form a well defined crease therein.

To facilitate positioning of the margin of the shoe upper between the jaws of the grippers and inspection of the results of the upper-pulling action of the grippers on the upper, as well as to provide clearance for a toe-end positioning device, to be described, to act on the shoe before the wipers commence to act on it, the wipers are arranged to occupy raised and rearwardly retracted positions away from the toe of the shoe until such time as the operator wishes to bring them forward over the shoe and cause them to operate.

The frame 5 (Fig. 2) has an upwardly extending guideway 339 formed in it rearward of the shoe-supporting device 11, 12 and on the extended center line of the latter. This guideway is perpendicular to the sole-supporting face 11. A rising and falling wiper-carrying head 341 has a depending slide 342 mounted in the guideway 339 and a link 343 is connected at 344 to a member 346 which is pivoted at 345 to the head 341. The member 346 is held in adjusted position by a screw 348 which engages an arcuate slot in a fixed member 350. The lower end of the link 343 is pivoted to the forward end of a cam-operated lever 347 which is pivotally mounted at its rear end on a fixed shaft 349 and carries a cam roll 351 at its front end which enters into a cam groove 352 (Fig. 15) in a disk on the cam shaft 151.

Figure 1:
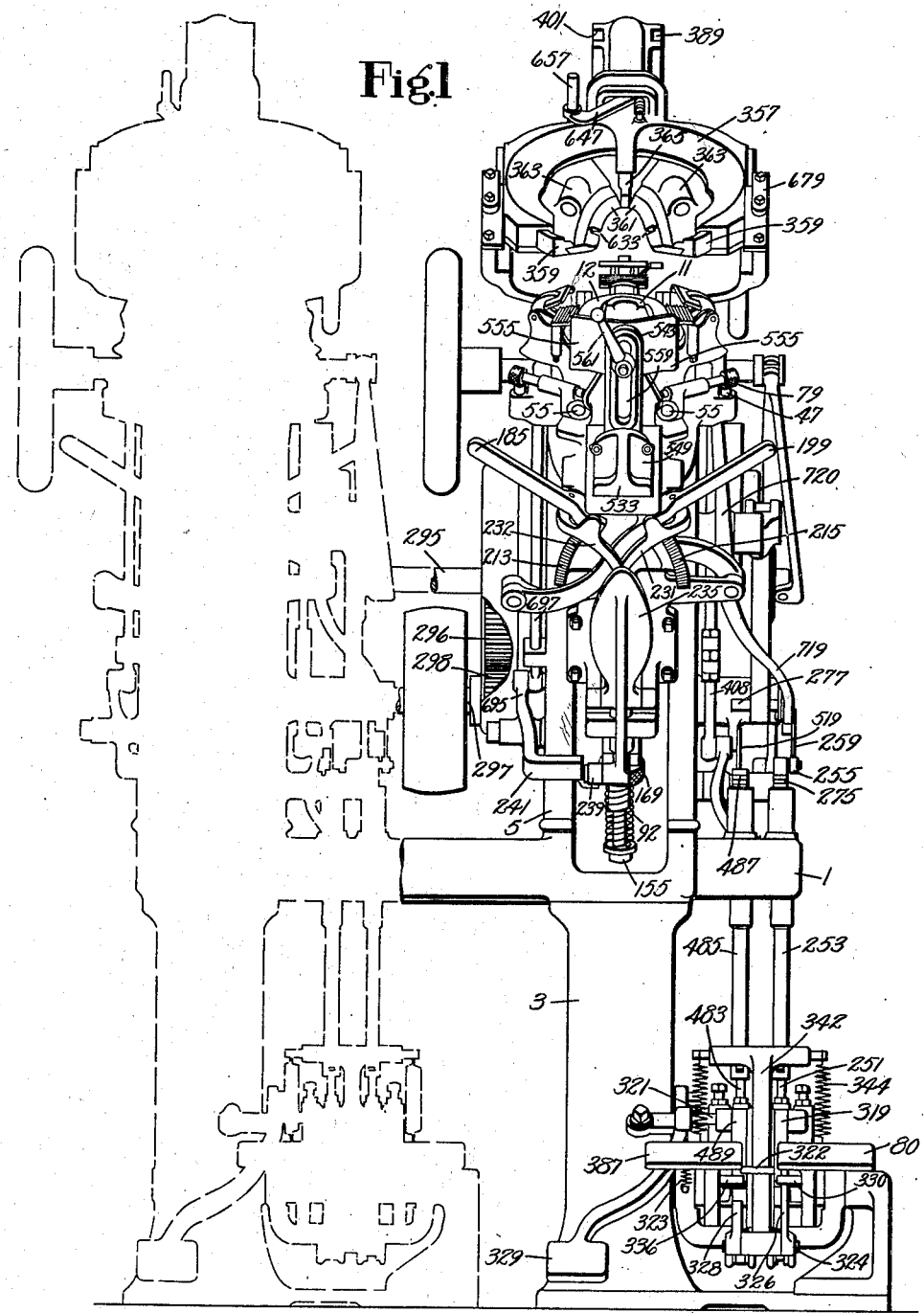
Fig. 1 is a front elevation of the machine, a second similar machine being indicated in dash lines.

The wiper-carrying head 341 is located when the machine is at rest in a position considerably higher than the sole-supporting face 11 and has formed along its upper portion a guideway 353 (Fig. 3) in which a wiper-carrying slide 357 is mounted for movement in a forward and rearward direction perpendicular to the slide 342. The wiper-carrying slide has a rear portion formed as a rectangular bar 355 and the forward portion 357 constitutes a wiper-enclosing box. The box 357 moves along the guideways 353 which both support it against yielding upwardly during the action of the wipers on the shoe and support it against tipping about an axis extending lengthwise of the shoe. The upper and lower sides of the box 357 bear against the upper and lower faces of a pair of supporting plates 359 for a pair of toe wipers 361, the wipers being secured to their supporting plates 359 in a readily detachable manner. The wiper-supporting plates 359, as shown in Fig. 1, may have cylindrical lugs 363 thereon (Fig. 1) with house electric heating cartridges for heating the wipers. The lugs are omitted in Fig. 3 and may be provided or not as desired.

Each of the two wipers 361 (Fig. 3) is appropriately shaped and of proper length to act on a shoe from a point near the center of the toe end to a point about one inch heelward of the tip line, and between the two wipers 361 opposite the center of the toe is an auxiliary wiping member 365 comprising a narrow finger which lies between the toe ends of the two wipers, the wipers engaging at their toe ends the opposite sides of the auxiliary wiping member 365.

The outer edge of each of the wiper-supporting plates 359 is formed concentrically about the point of contact 367 between its wiper and the adjacent side of the auxiliary wiping member 365, and the wiper-enclosing box 357 is provided with correspondingly curved grooves 369 along which the outer edges of the wiper-supporting plates 359 move as the wipers are closed. For thus moving the plates 359 and causing the wipers to open and close about the points 367, the wiper-carrying slide 355 has a guideway 371 (Fig. 7) extending along its length in which are housed a pair of wiper-operating slides 373, one associated with each wiper. Each wiper-supporting plate 359 (Fig. 3) has a roll 375 projecting downwardly through an open portion of the bottom of the wiper box 357 and each roll 375 enters into a straight slot 379 formed in a head 381 provided on the forward end of each of the wiper-operating slides 373. The slots 379 in the heads of the wiper-operating slides 373 extend rearwardly of the machine toward their outer ends at an angle of about 25° to a line extending widthwise of the machine so that, when the wipers are closely approaching their most advanced and closed positions and are acting to form the crease on the upper, the slots extend substantially radially of the points 367 about which the wipers pivot, and the rolls 375 lie in the outer portions of the slots 379 so that the wiper-operating slides 373 then act to force the wipers hard against the upper through a very favorable leverage.

When the machine is at rest and until the grippers have operated, the wiper-carrying head 341 (Fig. 2) occupies its raised position and the wiper-carrying slide is fully retracted, the wipers being closed and withdrawn lengthwise of the shoe away from over its toe. When the grippers have concluded their upper-tensioning action and the operator is satisfied that conditions are right for the commencement of the wiping operation, the wiper-carrying slide 355 is moved forward to operative position by the operation of a treadle 387 (Fig. 1), the wipers 361 are caused automatically to open to such an extent as to provide between them a space corresponding in shape to that of the toe portion of the particular shoe to be operated on, the wiper-carrying head 341 is then caused to descend by power-operated mechanism to cause the wipers to wipe downwardly around the toe portion of the last and to urge the upper, held tensioned and outspread by the grippers, against the side face of the last, and, when the under faces of the wipers have reached at least the level of the last bottom, the wipers are caused, also by power-operated mechanism, to advance and to close so that their inner edges will tuck the upper into the angle formed between the side face of the last and the sole margin and form a well defined crease on the upper.

The slide 355 has a groove 389 (Fig. 22) formed in its rear portion which is perpendicular to the guideway 371 in which the slide moves. Into the groove 389 projects a roll 391 supported on the upper end of an arm 393 which is pivoted on a horizontal rod 395. An arm 399 of a lever pivoted on the rod 395 engages the arm 393 at 400, the arms 393, 399 being held in contact by a spring 397 connected between them. A rear arm 402 of the lever pivoted at 395 is connected by a long tension spring 404 to a pin 406 on the frame. The arm 399 is connected by a link 408 to the front arm 410 of a lever pivoted at 93 and having a rear arm 412 connected by a link 414 to the rear arm 416 of the treadle lever 387. Depression of the treadle 387 therefore acts to advance the wiper-carrying slide 355, the spring 397 permitting further depression of the treadle to trip the clutch after the slide 355 has been fully advanced. The forward movement of the slide 355 is limited by contact between a depending lug 401 (Fig. 3) on the rear end of the slide 355 with a roll 403 (hereinafter referred to) which, during the treadle-operated advance of the slide 355, occupies a position in front of the lug 401. When the forward movement of the slide 355 is thus arrested, the toe ends of the wipers 361 will lie substantially directly over the toe end of the last in the shoe upper, the shoe having previously been positioned lengthwise on the shoe-supporting face 11 by cooperating toe and heel and gaging devices to be described. For causing the wipers 361 to occupy a closed-together relation when their carrying slide 355 is in its rearward position, the wiper-supporting plates 359 have springs 405 (Fig. 3) connected to them which act to urge the plates forwardly around the arcuate grooves 369 in the wiper-enclosing box 357.

The treadle-operated advance of the wiper-carrying slide 355 is made use of to position the wipers correctly lengthwise of the shoe for operation thereon and to cause them to move apart so that their edges will be positioned for wiping the upper against the side of the last when they descend. For this purpose the two wiper-operating slides 373 (Figs. 2 and 7) have lugs 407, 407 on their rear ends which extend downwardly through slots formed in a cover member 409 secured to the under side of the wiper-carrying slide and the two lugs lie close together widthwise of the machine.

Before the wiper-carrying slide 355 is moved forward by its treadle 387, a wiper-opening and closing roll 411 (Fig. 2) which is at rest during advance of the slide lies at the forward side of the lugs 407 at a distance therefrom which is somewhat less than that through which the slide is advanced by the treadle so that, just before the wiper-carrying slide 355 reaches its limit of movement, the depending lugs 407 on the wiper-operating slides 373 will be stopped by the roll 411. The wiper-enclosing box 257, however, will continue to advance with the wiper-carrying slide 355 and the consequent forward movement of the arcuate grooves 369 around the outer edges of the wiper-supporting plates 359 causes the wipers to open about their points 367 of contact with the auxiliary wiper 365.

Since the toe portions of shoes differ in width, provision is made for adjusting the extent to which the wipers are opened through the means just described so that the separation of the wipers will correspond to the width of the toe being treated. For this purpose the wiper opening and closing roll 411 is mounted on a short upwardly extending arm 415 (Fig. 5) of a bell-crank lever pivoted at 419 on a slide member 421 which is adjustable forwardly and rearwardly along the member 9. The slide member 421 has a groove formed obliquely across its under face, and a pin 423 extending from a threaded sleeve 427 enters this groove. The said sleeve is threaded on a stem 429 extending widthwise of the machine and carrying a hand wheel 431 (Fig. 2) at its right-hand end. By rotating the hand wheel 431 the threaded sleeve 427 is moved widthwise of the machine and the pin 423 in the oblique groove moves the slide member 421 and hence the roll 411 forward and rearwardly of the machine. After the wipers 361 have been thus opened a suitable amount to embrace the toe of the shoe they are drawn down by the link 343, and the roll 403 and the wiper opening and closing roll 411 are both swung forwardly to cause the wipers to advance and to close to perform their crease-forming action.

In order that the forward movement of the roll 403 may impart the necessary further advancing movement to the wiper-carrying slide 355 (Fig. 3), the slide has on its rear portion a relatively short downwardly extending face 433 the lower end 434 of which (Fig. 2) passes over the top of the roll 403 as the slide advances, this face being spaced from the lug 401 a distance equal to the diameter of the roll 403. When, therefore, engagement between the roll 403 and the forward face of the lug 401 has arrested the advance of the wiper-carrying slide 355 and, when the wiper-carrying head has thereafter descended, the forward face of the roll 403 lies against the face 433 on the slide 355 so that forward movement of the roll will so move the wiper-carrying slide 355.

In order that the forward movement of the wiper opening and closing roll 411 (Fig. 5) may impart the desired further closing movement to the wipers 361 as they are advanced by the forward movement of the roll 403, each wiper-operating slide 373 has a relatively short downwardly extending lug 435 (Fig. 2) formed on it forwardly of the lugs 407. The lower ends of the lugs 435 are so short that, as the wiper-operating slides 373 advance, they pass over the roll 411. The lugs 435 are spaced forwardly from the lugs 407 a distance greater than the diameter of the roll 411 so that if the roll 411 has been so adjusted that the edges of the wipers as they descend force the upper too hard against the last the wiper-operating slides 373 can move rearwardly a little in the wiper-carrying slide 355.

The roll 403 (Figs. 2 and 5) is mounted on an upwardly extending arm 437 of a bell crank lever pivoted on a rod 441 fixed on the frame, and the arm 437 is swung rearwardly by a spring 439 connected between it and a bracket 449 on the frame 9. For causing these two rolls 403, 411 to move forward after the wipers have descended, the bell crank carrying the roll 411 (Fig. 5) has an arm 445 to which is pivoted a link 447, and the bell crank lever carrying the roll 403 has an arm 449 to which is pivoted a link 451. The lower end of the link 447 is pivoted to the forward end of a lever 453 and the lower end of the link 451 is pivoted to the forward end of a lever 455, both levers being freely pivoted at their rear ends on the rod 349. The lengths of the arms 445, 449 of the bell crank levers and the lengths of the levers 453, 455 to which they are connected are so chosen that when the levers are operated by mechanism to be described the wiper opening and closing roll 411 advances faster than the roll 403 so that the wiper-supporting plates 359 (Fig. 3) are moved along the wiper-enclosing box during the advance of the latter and the wipers are therefore closed the desired amount. The forward ends of the levers 453, 455 (Fig. 5) rest on the upper edge of a plate 457 pivoted at 459 to the forward end of a lever 461 fulcrumed on the rod 349. On the rod 349 is also fulcrumed a cam-operated lever 463 carrying a roll 465 at its forward end which engages in a cam track 466 (Fig. 15) in a disk on the cam shaft 151 of the machine. The cam lever 463 has an arm 464 extending upwardly from its rear end, and a rotatable sleeve 467 passing forwardly through the arm has a stem 469 threaded in it which is pivoted to an ear 471 extending upwardly from the lever 461.

The cam lever 463 also has threaded through its upwardly extending arm 464 a pair of screws 473, 475 the ends of which are arranged to contact with faces 477, 479 on the two levers 455, 453 respectively and serve to maintain their forward ends in engagement with the upper edge of the plate 457. Since the plate 457 is virtually carried by the cam-operated lever 463 and since the screws 473, 475 which maintain the levers 455, 453 in engagement with its upper edge are also carried by the cam-operated lever 463, it will be understood that downward rocking movement of the forward end of the lever 463 will, through the screws 473, 475, cause both the roll 403 and the roll 411 to move forwardly and thus to advance and close the wipers, and that upward movement of the forward end of the lever 463 will, through the plate 457, cause the rolls 403, 411 to move rearwardly.

By rotating the sleeve 467 the heightwise position of the plate 457 can be varied and by correspondingly rotating the screws 473, 475 the forward ends of the levers may be caused to rest on the plate whatever be its position of adjustment. This arrangement may be used to determine the initial positions forwardly and rearwardly in the machine of both the rolls 403, 411 and, by the adjustment of the roll 411, to insure that the slide 355, when advanced by the treadle 387, will be arrested when the wipers occupy precisely the relation desired to the toe end of the shoe. In order to prevent angular movement of the plate 457 as its carrying lever 461 is raised and lowered, the plate has a slot 481 formed in it which embraces the countershaft 295. The slot 481 is so shaped that, as the plate is raised and lowered by rocking movement of its supporting lever 461, the upper edge of the plate remains always parallel to its initial position, thus preventing relative movement between the links 447, 451 as they move downwardly.

In the normal operation of the machine, the operator will depress the wiper-controlling treadle 387 only after the toe portion of the upper has been tensioned by the grippers and while the gripper-controlling treadle 80 is latched in its depressed position, the cam shaft 151 having come to rest automatically as described. The treadle 387 controlling the wipers has pivoted to it an upwardly extending link 483 (Fig. 1) which is pivoted at its upper end to a rod 485 which lies by the side of the rod 253 of the gripper-controlling treadle 80 and, like the rod 253, has a V-shaped block 487 on its upper portion arranged, during the final portion of the depression of the wiper-controlling treadle 387, to strike the pin 277 (Fig. 2) on the lower end of the latching lever 279 and to trip the clutch again for the machine to go through the second part of its cycle in which the cam shaft 151 rotates about 140° to draw the wipers downwardly by power and later to advance and close them. The wiper-controlling treadle 387 (Fig. 1) has a latching device comprising a latch 489 which is freely pivoted on the rod 321, is of the same type as the latch 319 of the gripper-controlling treadle 80, and holds the treadle 387 in its fully depressed position. The latch 489 is arranged to be swung rearwardly to allow the treadle to rise by means of a pin 322 (Figs. 1 and 2) secured in the latch 319, which pin extends in front of the latch 489. Therefore, whenever the pedal 329 is depressed, both treadles, if both are in depressed position, are unlatched and allowed to rise.

It is desirable that the wiper-controlling treadle 387 shall be prevented from being depressed far enough to cause engagement of the clutch until after the gripper-controlling treadle has been fully depressed and latched. To this end there are fixed on a shaft 324 (Figs. 1 and 2) two arms 326, 328. A curved forward face on the arm 326 is held against a pin 330 on the gripper-controlling treadle by a spring 332. The arm 328 is shorter than the arm 326 and has a flat upper end, and a pin 336 on the wiper-controlling treadle 387 lies directly above it. The arrangement is such that as the gripper-controlling treadle is depressed the pin 330 rides along the curved surface on the arm 326 and swings it and also the arm 328 rearwardly so that when the treadle 80 is fully depressed the arm 328 will have moved rearwardly from under the pin 336 and the wiper treadle 387 may be depressed to its full extent. Otherwise the flattened end of the arm 328 contacts with the pin 336 and limits the downward movement of the treadle 387, which movement, however, is sufficient to allow the wipers to be brought fully forward to enable an operator to adjust them correctly over a shoe on the shoe-supporting device 11 but is insufficient to trip the clutch.

Since the wiper-carrying slide advances a predetermined distance until arrested by the roll 403, it is important, since the wipers move downward to perform a heightwise wiping action on the upper, that the toe end of the last should lie directly beneath the toe end of the wipers so that the inner edges of the wipers will bear with the same pressure against the upper across the toe end and along the sides of the toe portion as they descend.

To locate the shoe lengthwise and widthwise in proper relation to the wipers, the illustrated machine is provided with a toe gage comprising a V-shaped device consisting of a pair of outwardly and forwardly extending ears 491 (Figs. 3 and 5) which, when in operating position, lie parallel to the plane of the sole-supporting face 11 and are secured by screws 492 passing through slots in the ears 491 into the opposite sides of an arm 493 so as to be independently adjustable lengthwise of the shoe. The arm 493 of the gage is bent and in its inoperative position, as shown in Fig. 5, is beyond the toe end of and below the shoe-supporting face 11. At its front end the arm is forked and each fork is pivoted at 495 on the member 9. When the gage is in use it is swung upwardly and forwardly over the toe gripper and then occupies such a relation to the wipers at the beginning of their downward movement that the opposite sides and toe end of a shoe thrust into the V-space provided between the ears 491 will lie substantially directly beneath the opposite sides and toe end of the edges of the wipers.

To facilitate the insertion of the margin of the upper between the jaws of the various grippers, the toe gage is initially in its inoperative position, is brought into position for use before the grippers commence to tension the upper, and is moved out of the way of the wipers before they act on the upper. To move the toe gage into and out of its operative position at the desired times, a downwardly extending rod 497 (Fig. 5) is pivoted at 499 to the gage-carrying arm 493 rearward of the pivots 495 of the arm, and a tension spring 501 is coupled to the lower end of this rod and tends normally to swing the arm to the position shown in Fig. 5. To swing the gage into operative position at the desired time, a slide 503 is mounted in the frame rearwardly of the pivots 495 of the arm 493 and the slide carries a roll 505 (Fig. 15) at its upper end against which the arm 493 is urged by the spring 501. Upward movement of this slide causes the arm to swing upwardly and forwardly until the gage overlies the sole-supporting face 11 in such a position that the toe portion of a shoe when thrust into the V-gap of the gage will occupy the desired position relatively to the wipers.

The toe gage is moved into its operative position over the shoe-supporting device substantially at the same time that the upper jaw of the toe gripper is allowed to descend toward the lower jaw. For this purpose the arm 91 (Fig. 5) has pivotally connected to its upper end the lower end of a short toggle link 507 the upper end of which is pivotally connected to the lower end of a toggle link 509. The upper end of the toggle link 509 (Fig. 14) is pivotally connected to an ear 511 extending from a sleeve 513 which is freely mounted on the shaft 263. Upward movement of the treadle rod 253 causes, through the roll 255 (Fig. 2) and finger 259, the desired rearward movement of the arm 91 (Figs. 5 and 14) which imparts a clockwise rocking movement, as seen from the right, to the sleeve 513 to which the toggle link 509 is connected, the two toggle links being at that time in a straightened condition. The sleeve 513 has a forwardly projecting arm 515 the free end of which is pivoted to the lower end of a link 517 which at its upper end is pivoted at 518 to the slide 503. Movement of the toe gage into its operative position will therefore occur substantially at the same time as the descent of the operating slide 81 which allows the toe gripper to close.

The sleeve 261 has a finger 519 (Fig. 2) similar to the finger 259 projecting from it at such a position that, when the sleeve 261 has been rotated by the rising of the rod 253 through depression of the gripper-controlling treadle 80, the finger 519 will have moved forwardly to a position similar to that previously occupied by the finger 259 and will then lie directly over the upper end of the rod 485 of the wiper-controlling treadle 387. Also, when the sleeve 261 has been rotated by the rising of the rod 253 and has therefore both caused the toe gripper jaws to close and the toe gage to assume its operative position, the two toggle links 507, 509 (Fig. 14) and the arm 91 to which the forward end of the link 507 is connected will lie in alinement with each other, the toggle links 507, 509 being normally held in straightened condition by a spring 521 and abutting faces on the links until they are broken.

During the initial portion of the depression of the wiper-controlling treadle 387 to bring the wiper-carrying slide 355 forwardly, the rod 485 rises and lifts the finger 519 on the sleeve 261, which as before described has been previously partially rotated by the depression of the gripper-controlling treadle 80, and causes the sleeve 261 to rotate farther in a clockwise direction as seen in Fig. 2. This further rotation of the sleeve causes the arm 91 to move rearwardly out of alinement with the toggle links 507, 509 (Fig.14) and thus imparts a movement in a counterclockwise direction to the sleeve 513 to which the toggle link 509 is connected. This causes a downward movement of the arm 515 to which the link 517 is connected and allows the spring 501 to pull the toe gage into its inoperative position before the depression of the wiper treadle is sufficient to cause the wipers to obstruct the retiring movement of the toe gage. As the arm 91 to which the toggle link 507 is connected approaches the limit of its rearward movement, a pin 523 carried on it strikes against a face 524 on a tail 525 of the toggle link 507 and thus breaks the toggle rearwardly as shown in dotted lines in Fig. 14. This insures that when the arm 91 eventually swings forwardly again on the falling of the rods 253, 485 it will not cause the toe gage to rise from its inoperative position and strike against the under faces of the wipers 361. Continued depression of the treadle 387 after the retirement of the gage will cause the latching lever 279 (Fig. 2) to release the clutch-tripping lever 281, causing a further rotation of the cam shaft 151 through about 140° during which the wipers will be drawn down around the toe of the shoe and advanced and closed.

The toe gage is used to position the shoe before the grippers operate and the downward pull of the grippers holds the last so firmly against the shoe-supporting face 11 that the shoe is held by friction from movement out of its correct position when the toe gage is later moved away. In order, however, to support the shoe against rearward movement under the heelward thrust of the wipers which takes place during their crease-forming action, the machine is provided with a heel end abutment (Fig. 2) which is caused automatically to engage the heel end of the shoe after its toe has been positioned by the toe gage and before operation of the wipers. The forwardly and downwardly sloping arm 7 has a guideway 529 (Fig. 5) formed in it, in which guideway a bar 531 is slidingly mounted. This guideway extends lengthwise of a shoe on the supporting face 11 and is inclined at about 20° to the horizontal. The sliding bar has secured on its forward end a bracket 533 (Figs. 1 and 2) which has in it a pivot pin 535 extending lengthwise of the bar 531 on which is freely mounted a short sleeve 537 having ears through which extends above the pin 535 a pivot pin 541 lying widthwise of the machine. An upright 543 lying substantially perpendicular to the sliding bar 531 is pivoted at its lower end on the pivot pin 541 and is urged forwardly about the pin 541 by a spring-pressed plunger 545 located in a rearwardly extending lug 547 on the upright and bearing against the upper face of the bracket 533. The bracket 533 has an upward extension 549 toward the rear face of which the upright 543 is urged by the spring-pressed plunger 545 and the extension has a slot formed in it which is concentric with the pivot 535 in the bracket 533 and which houses a correspondingly curved rack 551.

The upright 543 has a tooth 553 which engages the rack 551 and supports the upright in any position to which it may have been swung toward the left or right of the machine. The heel end abutment comprises a V-shaped fork 555 pivotally secured at 556 on a stud 557 passing through a slot 559 extending lengthwise of the upright 543. A handle 561 is threaded on the stud 557 by loosening which the fork 555 may be adjusted heightwise on the upright 543. The locking handle 561 may be used to swing the upright 543 rearwardly to remove the tooth 553 from the rack 551 and to swing the slideway toward the left or right. Secured to the under side of the fork 555 is an arm 562 on which the rear end of the shoe rests. The fork can be raised or lowered to cause it to occupy the best position for engagement with the opposite sides of the heel end of a shoe which is to carry a heel of any height and can also be tipped on its supporting stud 557 to aline its opposite sides with the opposite side faces of the heel end of the shoe.

For convenience the fork 555 is arranged to occupy, when the machine is at rest, a forward position and is moved rearwardly to engage the shoe before the grippers are power actuated to assist the toe gage in holding the shoe substantially positively against displacement under the pull which the grippers exert on the upper. After the fork 555 has engaged the shoe, it is automatically locked against heelward movement and remains in its operative position, after the toe gage has been withdrawn, to support the shoe against rearward movement until the end of the operation of the machine.

The sliding bar 531 carrying the fork 555 has connected to it a chain 563 which extends rearwardly of the machine and passes over a pulley 565. A weight 569 secured to the end of the chain 563 tends to draw the fork 555 rearwardly toward the heel end of the shoe. When, however, the machine is at rest ready for the presentation of a shoe to it, the heel fork 555 will have been drawn forwardly by the operator and will be prevented from moving rearwardly by a double-ended pawl 571 (Fig. 5) which is mounted on a pin 573 secured in a depending arm 574 pivoted at 576 on the member 9. The forward end of the pawl, as shown, engages rack teeth 575 on the under face of the sliding bar 531. The pawl 571, however, has a pin 577 extending laterally from it near its forward end which engages a notch formed in the upper end of a depending link 581 the lower end of which is pivoted to a forwardly extending arm 583 of a bell crank lever which is rotatable on the fixed shaft 263.

The bell crank lever has a downwardly extending arm 587 in which is formed a curved cam groove 589. Forwardly of this arm there is secured on the shaft 93 an arm 591 having a roll 593 on it which, when the machine is at rest, lies within the upper portion of the cam groove 589 in the arm 587. The cam groove 589 is so shaped that during the early portion of the rocking movement of the shaft 93 when the upper jaw of the toe gripper is allowed to descend and the toe gage rises to its operative position the roll 593 tracks along a concentric portion of the cam groove without imparting any movement to the arm 587 of the bell crank lever. When, however, the rocking movement of the shaft 93 is continued by further depression of the gripper-controlling treadle 80, the roll 593 passes along a sharply curved portion of the cam groove 589 and thus imparts to the forward end of the pawl 571 a downward movement to withdraw it from engagement with the teeth 575 on the sliding bar 531 carrying the fork 555. When this occurs the fork is moved rearwardly under the action of its weight 569 to engage the heel end of a shoe on the shoe-supporting face 11. The movement of the bell crank lever 585, 587 imparted to it by the cam roll is sufficient to swing the pawl by its pin-and-slot connection at 577 from a position in which a spring plunger 597 in the arm 574 acts on an inclined face of the pawl to hold its front end in engagement with the teeth 575 to a position in which the plunger 597 engages another inclined face on the pawl and holds its rear end 572 in engagement with the teeth 575. When the rearward end of the pawl has engaged the rack teeth it will prevent forward movement of the heel fork 555 but will allow rearward movement of the fork to continue under the action of the weight 569 until the shoe arrests its movement. The arm 574 (Fig. 5) has pivoted on its lower end a roll 599 which, as the wipers descend, is engaged by a cam face 601 (Fig. 2) on the wiper-carrying head slide 342 and causes the fork 555 through the pawl 572 to urge the toe end of the upper on the last into close contact with the descending wipers.

It is desirable that the wipers of the machine shall tuck the upper well beneath the last at the toe and sides so that the upper of the finished shoe may, around that region, present a sharply re-entrant angle between its outwardly extending flange and the portion of the upper on the side face of the last so that stitchdown shoes operated upon by the illustrated machine will be as shapely as shoes of more expensive types. If, however, the outwardly extending margin of the sole were supported unyieldingly with its upper face level with the last bottom, the wipers could only descend until their under faces were on a level higher than that of the last bottom by an amount substantially equal to the thickness of the outturned upper materials. Thus, the wipers could not tuck the upper far enough beneath the overhanging parts of the last to form as well defined a crease on the upper as is desired. To allow the wipers to descend below the position just indicated and to advance an ample distance beneath the overhanging parts of the last to form a well defined crease on the upper, the illustrated machine is provided with a peripheral sole support 12 which initially allows the outwardly extending marginal portion of the sole to be displaced downwardly as the wipers descend and which is later raised to press the margin of the sole and the outturned flange of the upper upwardly against the under faces of the wipers.

To this end, the shoe-supporting device (Figs. 5 and 6) comprises, beside the central stationary portion 11 which underlies the central portion only of the sole of a shoe, a surrounding or peripheral portion 12 which underlies the outer portion of the sole over a width extending inwardly from the edge of the sole for a distance, say half an inch, beyond the edge of the last bottom and which is movable heightwise of the shoe so as at one time to relieve upward pressure on the peripheral portion of the sole for the crease-forming action of the wipers and at another time to press the outwardly extending portion of the sole and the overlying flange of the upper upwardly against the wipers.

The central portion 11 of the shoe-supporting device comprises a plate which is secured to lugs 607 projecting upwardly from the frame 9. The surrounding portion 12 of the shoe-supporting device is somewhat larger in outline than the largest sole to be operated on and is of similar shape. The portion 12 has a central recess 609 (Fig. 6) similar in shape to but somewhat larger and deeper than the portion 11 which is received within this recess. The surrounding portion has holes through which the lugs 297 pass and is located initially with the bottom of the recess 609 about a quarter of an inch below the lower face of the central portion 11. The heel end of the portion 12 has a rounded under face which rests upon ledges 613 formed on one of the lugs 607. The surrounding portion 12 has midway of its width and on its under side a rounded recess 615 (Fig. 5) into which the upper end of a sliding rod 617 fits and supports the toe end of the portion 12. Upward movement of the sliding rod 617 will first cause the toe end of the surrounding portion 12 to rise relatively to the stationary central portion 11 about its line of contact with the ledges 613 and, when the toe end has pressed the toe end of the sole and upper up against the under faces of the wipers, will cause the heel end of the portion 12 to rise until it presses the margins of the sole and upper against the wipers throughout their length. Initially the sliding rod 617 occupies a lowered position, as shown, and the surrounding portion 12 is allowed to remain in its lower position throughout the operation of the grippers on the upper and until the wipers have descended and have then advanced and closed. The unsupported margin of the sole can be bent downwardly by the pressure exerted on it by the wipers and, since the portion 12 then offers no obstruction to descent of the wipers below the level of the last bottom by an amount equal to the thickness of the upper materials, the wipers are able after such movement to enter the angle between the side face of the last and the adjacent marginal portion of the sole and to force the upper beneath the last to form a relatively deep and sharply defined crease on the upper.

While the wipers remain in their crease-forming position, the surrounding portion 12 of the shoe-supporting device is raised to clamp the margin of the sole, together with the overlying upper flange, hard against the under faces of the wipers and thus not only to force the margins of the upper and sole together so firmly as to impart a semi-permanent set to them while the wipers are exerting their maximum crease forming action on the upper but also, if adhesive has previously been applied between the margins of the sole and upper, to cause these margins to become firmly secured together under relatively heavy pressure. Moreover, while the surrounding portion 12 remains in its raised position it affords a supporting bed for the margins of the work and thus enables fastenings driven from above in the manner hereinafter described to become securely anchored in the sole to hold the flange of the upper firmly in shaped condition to the sole.

For raising the surrounding portion 12, the sliding rod 617 rests upon the upturned end of a lever 619 which is pivoted to the frame 7 at 620 between its ends. A two-part link 621, 623 is pivoted at one end to the forward arm of the lever 619 and at its other end to the forward arm of a cam lever 625 pivoted between its ends on the same pivot 620 as the lever 619 and carrying at its rear end a cam roll 627 which engages a cam path 628 (Fig. 15) formed on a disk on the cam shaft 151. The parts 621, 623 of the two-part link are urged together by a strong compression spring 629. Upward movement of the rear end of the cam lever 625 will therefore impart a firm but yielding upward movement to the sliding rod 617 to operate the peripheral portion 12 of the shoe-supporting device in the manner above described and downward movement of the rear end of the lever will allow the rod 617 and portion 12 to fall. The holes 611 in the surrounding portion 12 through which the lugs 607 supporting the inner portion pass are larger than the lugs and therefore the surrounding portion of the shoe-supporting device is free to rock, within limits, in a substantially universal manner on the upper end of the sliding rod 617 so that it may accommodate itself to the heightwise dispositions of the margins of the sole at the opposite sides of the forepart.

While the shoe is under pressure, it may be desired to secure the margins of the upper and sole together by a few fastenings driven into the work around the toe portion alternatively to or additionally to securing them together by adhesive. For this purpose each wiper has a notch 633 (Fig. 1) formed in its inner edge into which the nozzle of a hand-operated fastening-inserting device (e. g., a stapling device) can be inserted while the wipers remain in their most advanced and closed-together position. In order to facilitate the driving of a third fastening into the work at the toe end of the shoe, the narrow auxiliary wiping member 365 is arranged to be withdrawn automatically as the surrounding portion 12 of the shoe-supporting device rises so as to leave a space overlying the margin of the upper at the extreme toe end of the shoe into which the nozzle of the fastening-inserting device may be inserted to drive a fastening into the work.

The auxiliary wiping member is formed as a bar 635 (Figs. 3 and 7) which is slidable along a guideway in the wiper-carrying slide 355. The bar has a flat head 637 on its rear end in which is a transverse slot 639. Extending into the slot is a pin 641 which is carried on the forward end of an arm 643 secured at its rear end to a rotatable stud 645 projecting upwardly from the wiper-carrying slide 355. A bell crank lever 647 is secured on the stud 645 and has a short, rearwardly extending arm 649 to which is coupled the rear end of a tension spring 651 connected at its forward end to a pin 653 on the wiper-enclosing box 357. The spring 651 normally maintains the pin 641 in engagement with the right-hand end of the slot 639, the arm 643 carrying the pin 641 then extending forwardly and rearwardly so that it holds the auxiliary wiping member against rearward movement as it is thrust against the shoe. The forward arm 647 of the bell crank lever extends toward the left of the machine and carries at its end a downwardly extending rod 657.

The cam lever 625 (Fig. 5) which raises the sliding rod 617 has the pivot pin for its cam roll 627 extended toward the left, which pin is embraced by the forward end portions of a short bifurcated arm 659 pinned on a rock shaft 661. The shaft 661 also has pinned to it an upwardly extending arm 663 the upper end of which lies directly in front of the depending rod 657 in the bell crank lever 647, the rod 657 lying close behind the lever 663 when the wiper-carrying slide 355 has been moved forward by depression of its treadle 387. Therefore, when the surrounding portion 605 of the shoe-supporting device is raised by its cam lever 625, the upper end of the upwardly extending arm 663 is rocked rearwardly and strikes against the depending rod 657 in the bell crank lever 647 and rocks the arm 649 to throw the spring 651 from the left-hand side of the stud 645 to the right-hand side thereof, so that the auxiliary wiping member 365 is moved rearwardly to provide the gap for insertion of the nozzle of the fastening device.

When, after the conclusion of the machine operation, the various parts are returning to their original positions, the rearward movement of the wiper-carrying slide 355 causes the rod 657 to engage a fixed stop 667 (Fig. 3) and thus the bell crank lever 647 is restored to its initial position and the gap between the wipers closed. The wipers are urged by springs 405 into a closed position when the wiper-carrying slide is retracted. The wiper carriers might, however, bind in their grooves and fail to move rearwardly at the conclusion of the operation of the machine, in response to the springs 405, into their fully closed position. Should this occur, the wiper-operating slides 373 might occupy such a position that when the wiper-carrying slide was once more brought fully forward the roll 411 would be beneath the depending lugs 437 and serious damage to these parts would result if the wipers were then moved down by their power-operated mechanism.

Positively to insure that the wipers will be returned to their closed position as they move rearwardly at the conclusion of the operation of the machine, two levers are pivoted at 669 on the wiper-carrying box 357, one at each side thereof. Each lever has an inwardly extending arm 671 which is slotted at its end and engages a pin 673 fixed in one of the heads 381 of the wiper-operating slides 373. The levers each have an outwardly extending arm 675 to the end of which is pivoted on a pin 676 a slotted link 677 which, when the wipers are in their forward position, extends rearwardly from its pivot 676. Secured to the wiper-carrying head 341 are two rearwardly extending arms 679 having pins 681 which engage slots 683 in the links 677. When the wiper-operating slides 373 are in their most forward position with the wipers closed, the distance from the center of the rounded end of the slots 683 to the center of the pins 676 is the same as the distance measured widthwise of the machine between the centers of the pins 681 and 676. Therefore, as the wiper-carrying slide 355 moves rearwardly from its forward position at the conclusion of the operation of the machine, at which time the pin 676 in the arm 675 occupies a position forwardly of the pin 681, the pins 676 move rearwardly past the pins 681 and through the links 677 rock the levers 671, 675 to cause the wipers to be moved positively to their closed position even should the springs 405 fail to do so.

If the grippers were to retain their maximum grip and pulling action on the upper while the wipers are concluding their downward movement in urging the upper against the side of the last and in pressing the outwardly extending flange of the upper against the sole, the wipers might tension the upper to such an extent as to damage or distort it. To avoid this, the machine is provided with means for relieving the grip of the three grippers on the upper as the wipers approach the lower limit of their movement so that the upper may slip more readily through the gripper jaws under the tensioning action of the wipers. For this purpose each of the carrier plates 23 (Fig. 6) for the grippers has mounted on the pivot 21 for the gripper jaws 17, 19 a member having a depending tail 689 resting constantly at its lower end on a face 691 on the frame lying parallel to the sole-supporting face 11 and a short upwardly extending finger 693 which lies, when the gripper is in the lowermost position, slightly above the top of the upper gripper jaw.

When the wipers 361 are approaching the lower limit of their movement, their lower faces contact with the upper ends of the fingers 693 which lie nearer the last than the pivots 21 on which the fingers are pivoted. Pressure on the fingers 693 as the wipers descend tends to move the tails 689 of the fingers downwardly and outwardly about their pivots 21, but since the tails are supported by the relatively fixed faces 691 they are prevented from moving in this direction. Therefore, the downward pressure on the fingers causes the gripper-carrying plates 23 to swing somewhat farther downward about their pivots 25, 55 on the member 9. At this time the rolls 18 which act to close the gripper jaws and to pull them downwardly are prevented from moving farther downwardly under the action of the springs 90, 92 at the lower ends of the operating rods for the grippers by the pawl 209 (Fig. 9) and the lower one of the two pawls 211 (Fig. 10) carried by the gripper-adjusting hand levers 173, 175, which pawls, as the wipers approach the position of contact with the fingers 693, are allowed to be urged by their springs 229 into engagement with their racks 213, 215 by upward movement of the cam surface 240 on the lever 241 (Fig. 5) which allows the lower end of the pawl-releasing lever 235 to swing rearwardly. The resulting forward movement of the upper arm of the lever 235 releases the arms 231, 232 on the hand levers 173, 175 and allows the pawls 209, 211, 211 to engage their racks 213, 215. The lever 241 has a rearwardly extending arm 695 (Figs. 1 and 5) which has pivoted to its end an upwardly extending rod 697 which is fixed at its upper end to the wiper-carrying head 341. Downward movement of the wiper-carrying head therefore causes the upward movement of the forward end of the lever 241. Downward movement of the gripper-carrying plates 23 (Figs. 5 and 6) therefore will cause the curved cam faces 37 to ride downwardly along the rolls 18 and thus to relieve the downward pressure of the upper gripper jaws on the upper. A reduced and non-positive but adequate grip of the jaws on the upper is, however, retained by reason of the spring plungers 29 beneath the lower gripper jaws 17 which urge them up to maintain the upper gripped yieldingly against the upper jaws 19.

It has been found in practice that, although the relief of grip afforded by the above arrangement is adequate for the two side grippers, it is important, to avoid unduly straining the upper materials, still further to relieve the grip of the toe gripper. To this end, there is formed on the bracket 83 (Fig. 5) which is secured to the toe gripper operating slide 81 an upwardly extended portion 699 having rack teeth 701 formed on its rear face. Pivoted at 702 on a bracket 703 secured to the frame 5 is a cam lever 705 having on its rear arm a cam roll 707 engaging a cam track 708 (Fig. 15) formed on a disk on the cam shaft 151. A forwardly extending arm of the lever 705 has pivoted thereon a pawl 711 having a downwardly extending tail 712 which is engaged by a pin 713 fixed in a bracket 715 secured on the rod 697. As the wipers, and so the rod 697, move downwardly the pin 713 rides along an inclined face on the tail 712 of the pawl 711 and allows the pawl to engage the rack 701 under the influence of a spring 718. When the wipers have engaged the fingers 693, the lever 705 is moved by its cam 708 so that its forward end rises and, through the pawl 711 and rack 701, raises the toe gripper operating slide 81 and still further relieves the grip of the toe gripper. When the wipers have nearly reached the limit of their downward travel, a second rise 716 on the cam face 240 engages the roll 239 and swings the lever 235 to release the pawls 209, 211, 211, thus allowing the gripper-operating slide 111 to rise sufficiently to give complete release of the three grippers preparatory to the advancing and closing movements of the wipers to tuck the upper into the crease between the sole and the last bottom.

It has previously been indicated that, when the cam shaft 151 has come to rest after the power operation of the grippers and before the power operation of the wipers, the operator may if he desires cause the grippers to return to their initial positions, thus releasing the shoe. Normally the cam shaft completes a single rotation or cycle in three successive steps: first, the grippers are operated by power; second, the wipers are operated by power; and third, the parts are restored to their initial positions. Means is provided, therefore, for causing omission of the second step of the cam shaft by preventing the latching lever 279 (Fig. 2) from raising the clutch-tripping lever at the end of the second step rotation of the cam shaft. For this purpose there is pivoted to the frame on the rod 287 a lever the upper arm 719 of which has an inclined face 721 formed thereon. The arm 719 is urged forwardly by a spring 723 and has a face which abuts against a pin 727 secured in the wiper-carrying head 341. The lower arm 720 of the lever extends downwardly and has pivoted at its lower end a hooked latch 729 the hooked end of which normally engages the pin 277 carried at the lower end of the latching lever 279. When, however, one or both treadle rods 253, 485 are raised, the upper end or ends thereof engage the latch 729 and hold its hooked end above the pin 277.

Assuming, therefore, that the operator has depressed the treadle 80 to cause the power operation of the grippers, he may, if unsatisfied with their action on the upper, release the treadle latch 319, allow the rod 253 to descend and so cause tripping of the clutch by engagement of the V-shaped block 275 with the pin 277, whereupon the latch 729 falls behind the pin 277 on the latching lever 279, and as the wiper-carrying head descends the pin 727 acting on the inclined face 721 rocks the lever 720, 719 clockwise, thus holding the shoulder 289 on the latching lever 279 clear of the plate 291. Therefore, as the latching lever 279 rises toward the end of the second step rotation of the cam shaft 151, it cannot disengage the clutch, and the cam shaft therefore continues through its final step rotation to restore the operative parts of the machine to their initial positions, rising of the wiper head allowing the lever 719, 720 to be returned by its spring 723 to initial position where the latch 729 does not interfere with the action of the latching lever 279 which lifts the tripping lever 292 as the cam shaft 151 reaches its initial position and stops the machine.

If, after the first one fifth of a revolution, the operator is satisfied with the operation of the grippers, he depresses the treadle 387 of the machine which causes the cam shaft 151 to rotate through approximately a further two fifths of a revolution and then come to rest. The work may remain under pressure while the other side of the machine is being used to operate similarly on a shoe for the other foot. Then the final two fifths of a revolution of the cam shaft 151 to release the work and return of the operative parts of the machine to their starting positions is initiated by operating the treadle 329 to release both treadles, thus allowing the treadle rods 253, 485 to descend, whereupon the first of the V-shaped blocks 275, 487 to reach the pin 277 will trip the clutch and starch rotation of the cam shaft through the final two fifths of a revolution. When the wiper-carrying head starts to rise, the pawls 209, 211, 211 are again allowed to engage their racks 213, 215. The top one of the two pawls 211 on the hand lever 173 is thus effective to prevent rising of both toe and side grippers until such time as the wipers have risen and been retracted sufficiently to prevent any risk of the grippers rising under the influence of the springs 153 and striking forcibly against the under side of the wipers.

When the machine is at rest in initial position, the wipers 361 will occupy a raised and rearwardly retracted position and will be in a closed-together relation with the forward edge of the auxiliary wiping member 365 in alinement with the adjacent portions of the inner edges of the wipers. The three grippers will occupy their raised, open and inward positions, the toe gage will occupy its rearwardly withdrawn and lowered inoperative position, and the operator will draw the heel fork 555 to its forward position if he has not previously done so. At this time also the portion 12 surrounding the shoe-supporting device 11 will occupy a lowered position in which the upper surface of the central and stationary portion 11 is about one quarter of an inch above the upper surface of the surrounding portion. Since the wipers, toe gage and heel fork all occupy withdrawn positions at this time, ample facility is afforded to the operator for him to present the shoe in the desired position in the machine. Before doing so, the operator will make sure that the wipers are of an appropriate shape for operating on that particular shoe, will if necessary adjust one of the side ears 391 of the toe gage forwardly or rearwardly relatively to the other in case the opposite sides of the toe portion of the shoe to be operated upon should be markedly unsymmetrical in shape, move the heel fork 555 laterally to an appropriate position to engage the shoe if the median lines of the forepart and heel end portions of the shoe should make an appreciable angle with each other, and if necessary adjust the side grippers forwardly or rearwardly to insure that they will act on the upper in precisely the positions desired along the sides of the shoe. He may also pull the wiper-carrying slide forwardly by a partial depression of the wiper-controlling treadle to insure that when it has reached its forward position the wipers will have been opened through the means previously described to an appropriate extent for them to embrace closely the sides and the toe end of the last when they are later drawn down along the latter. If it appears necessary the operator may adjust the extent of forward movement which will be imparted to the wipers and the extent to which the wipers are opened during this movement by adjusting the screws 473, 475 and sleeve 467. He may further, if necessary, make an adjustment of the arm 346 in the mechanism by which the wipers are drawn down by power to insure that, at their lower limit of movement, they will be low enough to pass under the bottom face of the last.

The operator then takes a stitchdown shoe S comprising an upper the forepart of which, at any rate, lies more or less loosely on its last and a sole tacked on the last bottom with its margin extending beyond the last bottom. He places the shoe with the sole resting on the inner portion 11 of the shoe-supporting device and threads the margin of the upper materials around the toe portion between the upper and lower jaws of the three grippers. He then depresses part way the treadle 80 controlling the grippers and the mechanism described first allows the upper jaw of the toe gripper to descend upon the margin of the upper supported by the lower jaw of that gripper and almost at the same time causes the toe gage 491 to move upwardly and forwardly into its operative position over the shoe-supporting device. The operator then temporarily retains this treadle in its partially depressed position. The toe gage will now lie directly in front of the toe end of the shoe and the operator urges the shoe rearwardly until its toe end fits snugly into the V-shaped fork of the toe gage 491 and is thus positioned correctly both forwardly and rearwardly and widthwise of the machine for the wipers later to act on the toe portion. He then depresses the gripper-controlling treadle somewhat farther, though not to its fully depressed position, and thereby allows the already adjusted heel fork 555 to move rearwardly under the action of its weight so that the heel end of the shoe thus becomes locked by it against rearward and lateral movement. While the shoe thus remains positioned in a more or less positive manner between the toe gage 491 and the heel end fork 555, the operator depresses the gripper-controlling treadle 80 to its lowest position where it is latched. The final portion of the depression of the treadle causes the cam shaft 151 to rotate through a first step, during which the toe gripper first gives a downward and lengthwise pull on the toe end of the upper and the opposite side grippers soon after exercise tensions on the side portions of the upper directed both heightwise of the shoe and widthwise and lengthwise thereof toward its toe end. The cam shaft automatically stops with the grippers holding the toe portion of the tensioned upper in an outspread condition convenient for its margin to be pressed down as a flange against the projecting marginal portion of the sole.

The operator then inspects the work and may, if he considers it advisable, cause the toe gripper and the side grippers to impart further tension to the upper by manipulation of the hand levers 185, 199 or may cause only the toe end gripper or the side grippers to increase the tension on the upper. If he finds that the toe portion of the upper needs to be moved bodily widthwise across the upper face of the last, he may swing the hand lever 199 forwardly or rearwardly and thus cause one of the side grippers to descend further and the other side gripper to rise to a corresponding extent to secure the result desired. If the operator should consider that the grippers have tensioned the upper in an unsatisfactory manner which he cannot correct sufficiently by manipulation of the grippers, he may release the latch holding the gripper-controlling treadle 80 depressed and thus allow this treadle to rise so that by the consequent completion of the rotation of the cam shaft 151 to its original position the three grippers will be restored to their raised and opened positions, this further rotation of the cam shaft taking place without causing any movement of the wipers forwardly because the wipers have not been advanced by their treadle 387.

Assuming that the grippers have performed their upper-tensioning action satisfactorily, the operator then begins to depress the wiper-controlling treadle 387 and by the early part of the descent of this treadle causes the wipers 371 to move forward to a proper position over the toe of the shoe and to open sufficiently from their original closed positions for them to pass downwardly along and close to the sides and end of the toe portion. Also during the early portion of the depression of this treadle and before the wipers have advanced so far as to obstruct this, the toe gage 491 is automatically withdrawn out the way. Continued depression of the wiper-controlling treadle 387 sets the clutch for the second step rotation of the cam shaft and causes the wipers to be first pulled down by power and later to be advanced farther somewhat and also to close a little farther. At this time the surrounding portion 12 of the shoe-supporting device is out of contact with the margin of the sole, and when, therefore, the wipers approach the level in which their under faces lie at least as low as the bottom face of the last, they can readily force the margin of the sole downwardly by pressure against the margin of upper overlying the margin of the sole, the grippers having been released as described by the descent of the wipers. As they descend, the wipers wipe the upper against the sides and toe end of the last and thus present the tensioned toe portion in a condition ready, when the wipers are in their lowest position, to have the crease formed on it by the further advancing and closing movement of the wipers which immediately follows the conclusion of their descent. Owing to the fact that the margin of the sole is unsupported by the shoe-supporting device 12 when the wipers advance and close to form the crease on the upper, the inner edges of the latter are able to enter the angle between the side face of the last and the adjacent portion of the sole and thus to tuck the upper well beneath the overhanging portion of the last. While the wipers remain in their fully advanced crease-forming positions, the sliding rod 617 which supports the toeward end of the surrounding portion 12 of the shoe-supporting device rises and first urges the toeward end of that portion upwardly to clamp the toeward end of the sole, together with the outturned flange of the upper, firmly up against the under faces of the wipers, and, when this end of the surrounding portion is unable to rise farther, continued rising of the sliding rod causes the heelward end of the surrounding portion also to rise until the whole of the margin of the sole which extends beneath the wipers and the flange of the upper overlying it are clamped hard up against the wipers. As the surrounding portion is raised in this manner, the auxiliary wiping member 365 which lies between the two wipers is automatically withdrawn so as to provide a notch within which the nozzle of a fastening-inserting device may be inserted to allow the fastening to be driven into the upper and sole at the toe end of the shoe. While the margins of the upper and sole are thus clamped between the wipers and surrounding portion, the operator may also drive a fastening through each of the notches 633 in the side portions of the wipers to secure the upper positively to the sole in those regions.

In some cases at least it may be desired that the flange of the upper be secured to the margin of the sole by adhesive as well as by, or instead of by, fastenings and in such a case the adhesive will have been applied between the margins of the upper and sole before the shoe is presented to the machine. When adhesive is used for this purpose the operator will normally allow the margins of the upper and sole to remain clamped between the heated wipers and the surrounding portion of the shoe-supporting device for a sufficient length of time to cause the adhesive to become sufficiently set to hold the flange firmly to the sole when the machine parts are later restored to their original positions, the fact that the wipers are heated serving to expedite the setting of the adhesive.

During the power operation of the wipers on the shoe, both the gripper-controlling and wiper-controlling treadles will have been latched in their fully depressed positions by the latching means 318, 489 and, when the operation on a shoe has been completed and the operator wishes the parts to be restored to their original positions to release the shoe, he need only operate the treadle 329 to release the latch 319 associated with the gripper-controlling treadle 80 and thus, by the pin 322 on the latch 319, release the latch 489 associated with the wiper-controlling treadle. Both treadles thereupon rise and the V-shaped block 275 or 487 upon the upper end of the rod associated with one of the treadles will, as the two rods descend, swing the latching lever 279 forwardly to release the clutch-tripping lever 281 so that the cam shaft 151 automatically becomes rotated through the further angle necessary to complete a single revolution of the cam shaft. During this final portion of the rotation of the cam shaft the wipers are raised to their original level, after having been withdrawn rearwardly a little and opened somewhat, and then move farther rearwardly in their raised positions to their initial positions, being restored to their original closed condition as they move rearwardly and the auxiliary wiping member 365 between them automatically moved forward relatively to them until its forward edge once more comes into alinement with the adjacent portions of the inner edges of the wipers. As the cam shaft completes its rotation, the grippers rise to their original position and open, and the surrounding portion of the shoe-supporting device falls to its original level out of contact with the sole. The pawl 571, which until that time has been preventing heelward movement of the heel end fork, is automatically rocked in a direction to remove its rearward end from engagement with the rack teeth on the sliding bar of the heel end fork and to allow its forward end to engage the rack teeth and the operator can therefore pull the heel end fork forward by his hand, it being then retained in a forward position by said pawl to allow him readily to remove the shoe from the machine.

Having thus described our invention, what we claim as new and desire to secure by Letters Patent of the United States is:

1. In a machine for working uppers over lasts, the combination of a support to receive the central portion of the forepart of a sole upon a last bottom, an initially inoperative support for the peripheral portion of the sole, toe-embracing wipers, means for relatively moving the wipers and the sole support heightwise of the last to shape the upper to the last, and means for moving the initially inoperative peripheral support toward the last.

2. In a machine for working uppers over lasts, the combination of a support to receive the central portion of the forepart of a sole upon a last bottom, an initially inoperative support for the peripheral portion of the sole, means for tensioning an upper over the last, toe-embracing wipers, means for relatively moving the wipers and the sole support heightwise of the last to shape the upper to the last, and means for moving the initially inoperative peripheral support toward the last.

3. In a machine for working uppers over lasts, the combination of a support to receive the central portion of the forepart of a sole upon a last bottom, an initially inoperative support for the peripheral portion of the sole, means for tensioning an upper over the last, toe-embracing wipers, means for moving the wipers toward the sole support to shape the upper to the last, and yieldingly operated power means for moving the initially inoperative peripheral support toward the last.

4. In a machine for working stitchdown uppers over lasts, the combination of a support to receive the central portion of the forepart of a sole upon a last bottom, an initially depressed support surrounding the central support, a pair of end-embracing wipers mounted for opening and closing movement in circular arcs, means for relatively moving the wipers and the support heightwise of the shoe to cause the wipers to conform the upper to the end and sides of the shoe, means for advancing and closing the wipers to tuck the upper under the last bottom, and means for raising the surrounding support to press the margin of the sole and the outturned upper against the wipers.

5. In a machine for working uppers over lasts, the combination of a support to receive the central portion of the forepart of the sole of a shoe presented right side up, an initially inoperative support for the peripheral part of the last bottom including the margin of the sole which projects beyond the last bottom, toe-embracing wipers movable heightwise of the shoe to shape the upper to the end and sides of the last and to work the upper into the angle between the projecting margin of the sole and the sides of the last, and power-operated means for raising the initially inoperative peripheral support to press the margin of the sole and the outturned upper against the wipers.

6. In a machine for working uppers over lasts, the combination of a support to receive the central portion of the forepart of the sole of a shoe presented right side up, an initially inoperative support for the peripheral part of the last bottom including the margin of the sole which projects beyond the last bottom, means for tensioning the upper downwardly and outwardly with respect to the supported last, toe-embracing wipers movable heightwise of the shoe to shape the upper to the end and sides of the last and to work the upper into the angle between the projecting margin of the sole and the sides of the last, and means for raising the initially inoperative peripheral support to press the margin of the sole and the outturned upper against the wipers.

7. In a machine for working uppers over lasts, the combination of a support to receive the central portion of the forepart of the sole of a shoe presented right side up, an initially inoperative support for the peripheral part of the last bottom including the margin of the sole which projects beyond the last bottom, toe-embracing wipers normally withdrawn from position over the shoe, manually operated means for bringing the wipers into position over the shoe, power-operated means for moving the wipers heightwise of the shoe to shape the upper to the end and sides of the last and to work the upper into the angle between the projecting margin of the sole and the sides of the last, and power-operated means for raising the initially inoperative peripheral support to press the margin of the sole and the out-turned upper against the wipers.

8. In a machine for working uppers over lasts, the combination of a support to receive the central portion of the forepart of the sole of a shoe presented right side up, an initially inoperative support for the peripheral part of the last bottom including the margin of the sole which projects beyond the last bottom, means for tensioning the upper downwardly and outwardly with respect to the supported last, toe-embracing wipers normally withdrawn from position over the shoe, manually operated means for bringing the wipers into position over the shoe, power-operated means for moving the wipers heightwise of the shoe to shape the upper to the end and sides of the last and to work the upper into the angle between the projecting margin of the sole and the sides of the last, and power-operated means for raising the initially inoperative peripheral support to press the margin of the sole and the outturned upper against the wipers.

9. In a machine for working uppers over lasts, the combination of a support to receive the central portion of the forepart of the sole of a shoe presented right side up, an initially inoperative support for the peripheral part of the last bottom including the margin of the sole which projects beyond the last bottom, means for tensioning the upper downwardly and outwardly with respect to the supported last, toe-embracing wipers initially withdrawn longitudinally of the shoe from position over the shoe, power-operated means for moving the wipers heightwise of the shoe, a treadle for bringing the wipers into position over the shoe, power-operated means for advancing and closing the wipers to tuck the upper under the last bottom, means operated by further depression of the treadle to initiate the power operation of the wipers to cause them first to move heightwise of the shoe and then to advance and close, and power-operated means for operating the initially inoperative peripheral support to press the margin of the sole and the outturned upper against the wipers.

10. In a machine for working uppers over lasts, the combination of a support to receive the central portion of the forepart of the sole of a shoe presented right side up, a support for the peripheral part of the last bottom including the margin of the sole which projects beyond the last bottom, said peripheral support being initially located below and out of contact with the sole, means for tensioning the upper downwardly and outwardly with respect to the supported last, toe-embracing wipers, power-operated means for moving the wipers heightwise of the shoe, power-operated means for advancing and closing the wipers to tuck the upper under the last bottom, said power means being arranged first to cause the wipers to move heightwise of the shoe and then to advance and close, and power-operated means for operating the peripheral support to press the margin of the sole and the outturned upper against the wipers.

11. In a machine for working uppers over lasts, the combination of a support to receive the central portion of the forepart of a sole upon a last bottom, an initially inoperative support for the peripheral portion of the sole, grippers mounted for movement in outwardly and downwardly directed paths with respect to the last, means for closing the grippers upon the upper and moving them in said paths to tension the upper, end-embracing wipers, means for moving the wipers heightwise of the last to work the upper into the angle between the side of the last and the projecting margin of the sole, and means for moving the initially inoperative peripheral support toward the last.

12. In a machine for working uppers over lasts, the combination of a support to receive the forepart of the sole of a shoe, end-embracing wipers mounted for bodily movement longitudinally of the shoe to carry them into and out of position over the shoe, means for effecting heightwise movement of the wipers to perform their wiping operation on the shoe, and a treadle arranged first to move the wipers into operative position and then cause their heightwise movement.

13. In a machine for working uppers over lasts, the combination of a support to receive the forepart of the sole of a shoe, end-embracing wipers mounted for bodily movement longitudinally of the shoe to carry them into and out of position over the shoe, power-operated means for depressing the wipers to perform their wiping operation on the shoe, and a treadle arranged first to move the wipers into operative position and then cause their power movement.

14. In a machine for working uppers over lasts, the combination of a support to receive the forepart of a sole upon a last bottom, end-embracing wipers mounted for movement longitudinally of the shoe into and out of position over the shoe toe, means for closing the wipers when in their retracted position, and means for opening the wipers to a predetermined extent as a result of their movement into operative position over the shoe.

15. In a machine for working uppers over lasts, the combination of a support to receive the forepart of a sole upon a last bottom, end-embracing wipers mounted for movement longitudinally of the shoe into and out of position over the shoe toe, means for closing the wipers when in their retracted position, means for opening the wipers to a predetermined extent as a result of their movement into operative position over the shoe, and means for varying the predetermined open position of the wipers when presented over the shoe.

16. In a machine for working uppers over lasts, the combination of a support to receive the forepart of a shoe upon a last bottom, end-embracing wipers mounted for bodily movement longitudinally of the shoe into and out of operative position, means for closing the wipers when in their retracted position, wiper-operating slides, an abutment for arresting the slides during the bodily movement of the wipers to open the wipers to a predetermined extent, and means for adjusting the abutment longitudinally of the slides to vary the predetermined open position of the wipers when presented in operative position.

17. In a machine for working uppers over lasts, the combination of a support to receive the forepart of the sole of a shoe, end-embracing wipers arranged for opening and closing movements and mounted for bodily movement longitudinally of the shoe to carry them into and out of position over the shoe, means of adjusting the open position of the wipers to suit a given shoe, means for depressing the wipers to perform their wiping operation on the shoe and for advancing and closing the wipers, and a treadle depression of which first moves the wipers bodily over the shoe and upon further depression causes their heightwise movement and their advancing and closing movement.

18. In a machine for working uppers over lasts, the combination of a support to receive the forepart of the sole of a shoe, end-embracing wipers arranged for opening and closing movements and mounted for bodily movement longitudinally of the shoe to carry them into and out of position over the shoe, means for insuring that the wipers will be closed when in their withdrawn position, means operating upon bodily advance of the wipers to open them to a predetermined extent, means for adjusting their open position to suit a given shoe, power-operated means for depressing the wipers to perform their wiping operation on the shoe and for advancing and closing the wipers, and a treadle depression of which first moves the wipers bodily over the shoe and upon further depression initiates their power heightwise movement and their advancing and closing movement.

19. In a machine for working uppers over lasts, the combination of a support to receive the forepart of a sole upon a last bottom, end-embracing wipers mounted for movement longitudinally of the shoe into and out of position over the shoe, said wipers being arranged for movement in circular arcs to open and close, pins on the wipers, slides arranged for movement longitudinally of the shoe and having lateral slots engaging the pins, means for arresting the slides during the bodily movement of the wipers into operative position to cause the wipers to open, means for moving the wipers heightwise of the shoe, and means for advancing the wipers bodily simultaneously with their closing movement whereby the upper is tucked under the end and sides of the last.

20. In a machine for working uppers over lasts, the combination of a support to receive the forepart of a sole on a last bottom, end-embracing wipers mounted for bodily movement longitudinally of the shoe into and out of position over the shoe toe, means for closing the wipers when in their retracted position, means for opening the wipers to a predetermined extent as a result of their movement into operative position over the shoe, means for effecting heightwise movement of the wipers to work the upper under the end and sides of the last, a pair of angle levers operation of one of which closes the wipers and operation of the other of which imparts further bodily advancing movement thereto, a single cam for operating both angle levers to wipe the upper under the end and sides of the shoe bottom, and means for varying the relation of the levers to the cam and so varying the extent of advancing movement and closing movement relatively to the shoe.

21. In a machine for working uppers over lasts, the combination of a support to receive the forepart of a sole on a last bottom, end-embracing wipers mounted for bodily movement longitudinally of the shoe into and out of position over the shoe toe, means for closing the wipers when in their retracted position, means for opening the wipers to a predetermined extent as a result of their movement into operative position over the shoe, means for effecting heightwise movement of the wipers to work the upper over the end and sides of the last, a pair of angle levers operation of one of which closes the wipers and operation of the other of which imparts further bodily advancing movement thereto, and a single cam for operating both angle levers to wipe the upper under the end and sides of the shoe bottom.

22. In a machine for working uppers over lasts, the combination of a support to receive the forepart of a sole upon a last bottom, end-embracing wipers mounted for movement longitudinally of the shoe into and out of position over the shoe, said wipers being arranged for movement in circular arcs to open and close, pins on the wipers, slides arranged for movement longitudinally of the shoe and having lateral slots engaging the pins, means for arresting the slides during the bodily movement of the wipers into operative position to cause the wipers to open, means for moving the wipers heightwise of the shoe, and means for thereafter advancing the slides to cause the wipers to tuck the upper under the shoe bottom.

23. In a machine for working uppers over lasts, the combination of a support to receive the forepart of a shoe upon a last bottom, end-embracing wipers mounted for bodily movement longitudinally of the shoe into and out of operative position, means for closing the wipers in their retracted position, wiper-operating slides, an abutment for arresting the slides during the bodily movement of the wipers to open the wipers to a predetermined extent, a slide carrying said abutment and movable in the same direction as the wiper-operating slides, and screw-operated means for adjusting said abutment-carrying slide.

24. In a machine for working uppers over lasts, the combination of a support to receive the forepart of a sole on a last bottom, end-embracing wipers mounted for bodily movement longitudinally of the shoe into and out of position above the shoe toe, means for closing the wipers when in their retracted position, means for opening the wipers to a predetermined extent when they are moved into operative position above the shoe, means for effecting heightwise movement of the wipers to work the upper over the end and sides of the last, a pair of angle levers one for closing the wipers and the other for advancing the wipers, a cam, a single cam lever, a link connecting each angle lever to the cam lever, and means for varying the effective lengths of said links.

25. In a machine for working uppers over lasts, the combination of a support to receive the forepart of a sole on the last bottom, end-embracing wipers mounted for bodily movement longitudinally of the shoe into and out of operative position over the shoe toe, said wipers being closed in their retracted position, means for opening the wipers to a predetermined extent when they move into operative position over the shoe, means for effecting heightwise movement of the wipers to work the upper over the end and sides of the last, a pair of levers one for closing the wipers and the other for advancing the wipers, a cam-operated lever, and variable connections therefrom to said pair of levers whereby upon adjustment the cam lever will impart to the wipers different extents of closing movement and bodily advancing movement.

26. In a machine for working uppers over lasts, the combination of a support to receive the forepart of the sole of a shoe, end-embracing wipers mounted for movement heightwise of the shoe, each wiper being mounted for movement in a plane parallel to the shoe bottom in a circular arc the center of which is at the toe end of a wiping edge of the wiper, slides movable lengthwise of the shoe, pin-and-slot connections between the wipers and the slides, and means for operating the slides to open and close the wipers.

27. In a machine for working uppers over lasts, the combination of a support to receive the forepart of a sole upon a last bottom, end-embracing wipers mounted for bodily movement longitudinally of the shoe into and out of operative position above the shoe, said wipers being arranged for opening and closing movement in circular arcs, pins on the wipers, wiper-operating slides arranged for movement longitudinally of the shoe and having lateral slots engaging the pins, lugs projecting from said slides, a lever having a roll arranged to engage the lugs to cause the wipers to open, other lugs on the slides spaced from the first lugs at least the diameter of the roll, means for moving the wipers heightwise of the shoe to conform the upper to the last, and means for operating the lever to engage the second lugs and move the slides forward to cause closing movement of the wipers.

28. A machine according to claim 27 having means for positively returning the wipers to their closed position when they are moved bodily to their inoperative position.

29. In a machine for working uppers over lasts, the combination of a support to receive the forepart of a sole upon a last bottom, end-embracing wipers mounted for bodily movement longitudinally of the shoe into and out of position above the shoe, said wipers being mounted for movement in circular arcs and each having a pin on its lower side, wiper-operating slides arranged for movement longitudinally of the shoe and each having a slot engaging one of the pins, a pair of lugs on the lower side of each slide, one lug being shorter than the other, a roll located between the short lugs and the long lugs, a lever carrying the roll, and means for operating the lever, the arrangement being such that upon bodily movement of the wipers the short lugs pass over the roll and the long lugs engage the roll to cause opening movement of the wipers and upon operation of the lever the roll engages the short lugs and causes closing of the wipers.

30. In a machine for working uppers over lasts, the combination of a fixed support to receive the forepart of a shoe presented right side up, end-embracing wipers mounted for movement heightwise of the shoe toward the shoe bottom, power-operated means for so moving the wipers, and means for varying the lower limit of movement of the wipers with respect to the support.

31. In a machine for working uppers over lasts, the combination of a support to receive the forepart of a sole upon a last bottom, a pair of end-embracing wipers, an auxiliary wiper located between the wipers, means connected with the wipers to cause them to open and close, means for moving the wipers heightwise of the shoe, means for advancing and closing the wipers to cause them to tuck the upper under the shoe bottom, and means for withdrawing the auxiliary wiper.

32. In a machine for working uppers over lasts, the combination of a support to receive the forepart of a sole upon a last bottom, a pair of end-embracing wipers, an auxiliary wiper located between said wipers, a carrier for the auxiliary wiper mounted to slide in the plane of the wipers and having a transverse slot, and an arm having a pin located in said slot, the pin acting in one position of the arm to hold the auxiliary wiper against movement and in another position of the arm permitting retraction of the auxiliary wiper to provide a gap between the end-embracing wipers.

33. In a machine for working uppers over lasts, the combination of a support to receive the forepart of a sole upon a last bottom, a pair of end-embracing wipers, an auxiliary wiper located between said wipers, a carrier for the auxiliary wiper mounted to slide in the plane of the wipers and having a transverse slot, an arm having a pin located in said slot, the pin acting in one position of the arm to hold the wiper against movement and in another position of the arm permitting retraction of the auxiliary wiper to provide a gap between the end-embracing wipers, and a spring arranged to hold the arm in either of its two positions.

34. In a machine for working uppers over lasts, the combination of a support to receive the forepart of a sole upon a last bottom, a pair of end-embracing wipers, an auxiliary wiper located between said wipers, means for operating the wipers to last a shoe, a carrier for the auxiliary wiper mounted to slide in the plane of the wipers and having a transverse slot, an arm having a pin located in said slot, the pin acting in one position of the arm to hold the auxiliary wiper against movement and in another position of the arm permitting retraction of the auxiliary wiper to provide a gap between the end-embracing wipers, a lever connected to said arm, means for moving the lever in one direction to hold the auxiliary wiper against movement before the wipers are operated, and means for moving the lever in the other direction to retract the auxiliary wiper while the end-embracing wipers remain in working position.

35. In a machine for working uppers over lasts, the combination of a support to receive the forepart of a sole upon a last bottom, a pair of end-embracing wipers mounted for movement longitudinally of the shoe into and out of operative position above the shoe, an auxiliary wiper located between the pair of wipers, said pair of wipers being each arranged for movement in a circular arc above the front corner of the auxiliary wiper, wiper-operating slides arranged for movement longitudinally of the shoe and having pin-and-slot connections with the wipers to cause them to open and close, means for moving the wipers heightwise of the shoe, means for thereafter advancing the wiper-operating slides to cause the wipers to tuck the upper under the shoe bottom, and automatic means for withdrawing the auxiliary wiper.

36. In a machine for working stitchdown uppers over lasts, the combination of a support to receive the central portion of the forepart of a sole upon a last bottom, an initially depressed support surrounding the central support, an auxiliary wiper located at the end of the toe, a pair of end-embracing wipers mounted for opening and closing movement in circular arcs about the front corners of the auxiliary wiper, means for relatively moving the wipers and the support heightwise of the shoe to cause the wipers to conform the upper to the end and sides of the shoe, means for advancing and closing the wipers to tuck the upper under the last bottom, means for raising the surrounding support to press the margin of the sole and the outturned upper against the wipers, and means for simultaneously withdrawing the auxiliary wiper to facilitate the insertion of a fastening through the upper and sole at the toe of the shoe.

37. In a machine for working stitchdown uppers over lasts, the combination of a support to receive the central portion of the forepart of a sole upon a last bottom, an initially depressed support surrounding the central support, an auxiliary wiper located at the end of the toe, a pair of end-embracing wipers mounted for opening and closing movement in circular arcs about the front corners of the auxiliary wiper, means for moving the wipers bodily from an inoperative position into position above the toe, means for relatively moving the wipers and the support heightwise of the shoe to cause the wipers to conform the upper to the end and sides of the shoe, means for advancing and closing the wipers to tuck the upper under the last bottom, means for raising the surrounding support to press the margin of the sole and the outturned upper against the wipers, means for simultaneously withdrawing the auxiliary wiper to facilitate the insertion of a fastening through the upper and sole at the toe of the shoe, and means operated by bodily movement of the wipers into inoperative position for restoring the auxiliary wiper to operative position with its end flush with the edges of the end-embracing wipers.

38. In a machine for working uppers over lasts, the combination of a support to receive the bottom of a shoe presented right side up, power-operated toe and side grippers arranged to close upon the upper and tension it downwardly and outwardly with respect to the last, a gripper-controlling treadle, and connections therefrom to the toe gripper to cause closing of the toe gripper prior to closing of the side grippers and then to cause the power operation of the side grippers and the toe gripper together.

39. In a machine for working uppers over lasts, the combination of a support to receive the bottom of a shoe presented right side up, power-operated toe and side grippers arranged to close upon the upper in their initial position and then to move downwardly and outwardly with respect to the last to tension the upper, a gripper-controlling treadle, means operated by depression of the treadle first to cause closing of the toe gripper prior to closing of the side grippers and then to initiate the power operation of all the grippers together, means for locking the treadle in depressed position, and means operating automatically upon release of the treadle to restore the grippers to initial position.

40. In a machine for working uppers over lasts, the combination of a support to receive the bottom of the fore-part of a shoe, toe and side grippers mounted on the shoe support for movement in downwardly and outwardly directed paths with respect to the last, means for closing the grippers upon the upper and moving them in said paths to tension the upper, and means for reducing the outward component of movement of the side grippers with respect to the toe gripper.

41. In a machine for working uppers over lasts, the combination of a support to receive the bottom of the forepart of a shoe, toe and side grippers pivoted on the shoe support for movement in downwardly and outwardly directed paths with respect to the last, means for closing the grippers upon the upper and moving them in said paths to tension the upper, pin-and-slot connections between the pivots of the grippers and their jaws, and cam means on one of the so connected parts acting to reduce the outward component of movement of the side grippers relatively to their downward component.

42. In a machine for working uppers over lasts, the combination of a support to receive the bottom of the shoe, toe and side grippers arranged with their lower jaws substantially above and parallel to the sole-receiving face of the support, abutments for the lower jaws of the grippers, yielding means for supporting the lower jaws of the grippers initially above the abutments, and power-operated means to close the grippers upon the upper, force the lower jaws against the abutments and tension the upper downwardly and outwardly with respect to the last.

43. In a machine for working uppers over lasts, the combination of a support to receive the bottom of a shoe, toe and side grippers arranged with their jaws substantially above and parallel to the sole-receiving surface of the support, abutments for the lower jaws of the grippers, springs for supporting the lower jaws of the grippers initially above the abutments, and power means to close the grippers upon the upper, force the lower jaws against the abutments and tension the upper downwardly and outwardly with respect to the last, said springs acting upon reverse movement of the power-operated means to retain a slipping grip upon the upper.

44. In a machine for working uppers over lasts, the combination of a support to receive the bottom of a shoe, toe and side grippers pivoted to said support for downward and outward movement with respect to the shoe, springs supporting the grippers in their raised initial positions, a power-operated slide for each of the grippers, and a bracket on each slide supporting one of said springs whereby operation of the slides to close and move the grippers does not increase the tension of the springs.

45. In a machine for working uppers over lasts, the combination of a support to receive the bottom of a shoe, toe and side grippers pivoted to the support for downward and outward movement with respect to the shoe, springs supporting the grippers in their raised initial positions, a power-operated slide for each of the grippers, and a bracket on each slide supporting one of said springs whereby the tension of the supporting spring remains substantially constant notwithstanding downward movement of the gripper in a direction to tension the spring.

46. In a machine for working uppers over lasts, the combination of a support to receive the bottom of a shoe, toe and side grippers pivoted to said support for downward and outward movement with respect to the shoe, hollow plungers for sustaining the grippers in initial position, springs operating to raise the plungers, and adjustable means for limiting upward movement of the plungers so that the initial position of the grippers may be varied.

47. In a machine for working uppers over lasts, the combination of a support to receive the bottom of a shoe, toe and side grippers pivoted to said support for downward and outward movement with respect to the shoe, hollow plungers for sustaining the grippers in initial position, springs operating to raise the plungers, and screws engaging said plungers to limit upward movement thereof, turning of the screws serving to vary the initial position of the grippers.

48. In a machine for working uppers over lasts, the combination of a support to receive the bottom of a shoe, toe and side grippers arranged for downward and outward movement with respect to a shoe on the support, said side grippers being mounted for movement about converging rods journaled beneath the shoe-engaging face of the support, an arm on each of the rods, a tooth carried by said arm, a stationary rack parallel with the rod to be engaged by said tooth, and spring means normally holding the tooth and rack in engagement and permitting rocking of the rod to release the tooth so that the rod may be adjusted longitudinally to vary the location of the side gripper with respect to the toe gripper.

49. In a machine for working uppers over lasts, the combination of a support to receive the bottom of a shoe, toe and side grippers arranged for downward and outward movement with respect to a shoe on the support, said side grippers being mounted on converging rods journaled beneath the shoe-engaging face of the support, an arm on each of the rods, a stationary rack parallel with the rod, screws threaded through said arms and having pointed ends, and spring means normally holding the pointed ends against the rack, turning of said screws serving to adjust each side gripper toward and from the other.

50. In a machine for working uppers over lasts, the combination of a support to receive a sole upon a last bottom, grippers arranged to seize and tension the upper heightwise of the shoe, end-embracing wipers mounted for movement heightwise of the shoe, and means carried by the grippers and operated by the heightwise movement of the wipers for relieving the grip of the grippers.

51. In a machine for working uppers over lasts, the combination of a support to receive the forepart of a sole upon a last bottom, grippers arranged to seize and tension the upper heightwise of the shoe, end-embracing wipers mounted for movement heightwise of the shoe, fingers mounted on the grippers, and means for preventing heightwise movement of one end of the fingers with the grippers, the other ends of the fingers being arranged to be engaged by the wipers in their heightwise movement to cause the grippers to relieve their grip upon the upper.

52. In a machine for working uppers over lasts, the combination of a support to receive the bottom of a shoe, toe and side grippers pivoted to the support for downward and outward movement with respect to the shoe, wipers mounted for movement heightwise of the shoe to wipe the upper toward the last bottom, a slide for each of the grippers, power-operated means acting through the springs to move the slides to tension the upper, a curved finger pivoted between its ends to each of the grippers, one end of the finger being arranged to be engaged by the wipers in their outward movement, the other end of the finger being supported by a fixed surface located inwardly of the pivot of the finger, movement of the wipers toward the shoe-bottom-engaging finger causing the associated gripper to release its grip upon the upper, and means for preventing return movement of the gripper slides until the wipers have moved away from the shoe bottom.

53. In a machine for working uppers over lasts, the combination of a support to receive the bottom of a shoe presented right side up, toe and side grippers arranged to close upon the upper and then to move downwardly and outwardly with respect to the last to tension the upper, power-operated means for so moving the grippers, a hand lever connected to the toe gripper for increasing its tension on the upper, and a hand lever connected to the side grippers so that movement of the lever in one direction will increase the tension of both side grippers on the upper and movement of the lever in another direction will move one side gripper in a direction to lessen the tension on the upper and the other side gripper an equal amount in a direction to increase its tension.

54. In a machine for working uppers over lasts, the combination of a support to receive the bottom of a shoe presented right side up, toe and side grippers arranged with their lower jaws substantially above and parallel to the sole-receiving face of the support, power-operated means to close the grippers upon the upper and tension it downwardly and outwardly with respect to the last, a lever connected to the toe gripper by manipulation of which its tension may be increased, and a lever connected to the side gripper by manipulation of which the tension of the two side grippers may be increased, the side gripper lever being constructed and arranged for lateral movement and having connections to the side grippers whereby lateral movement of the lever causes one side of the upper to be tightened and the other loosened.

55. In a machine for working uppers over lasts, the combination of a support to receive the bottom of a shoe presented right side up, toe and side grippers arranged to close upon the upper and then to move downwardly and outwardly with respect to the last to tension the upper, power-operated means for moving the grippers, and a hand lever connected to the side grippers so that when moved in one direction it will increase the tension of both side grippers on the upper and when moved in another direction will move one side gripper in a direction to increase the tension on the upper and the other side gripper in the opposite direction to lessen the tension.

56. In a machine for working uppers over lasts, the combination of a support to receive the forepart of a sole upon a last bottom, a V-shaped toe gage arranged for movement into operative position to locate longitudinally and laterally a shoe on said support and for movement into inoperative position, grippers arranged to seize and tension the upper heightwise of the last, and manual means operating first to move the gage into operative position and then to cause operation of the grippers.

57. In a machine for working uppers over lasts, the combination of a support to receive the bottom of the forepart of a shoe, toe and side grippers, means for closing the grippers upon the upper and moving them to tension the upper, a toe gage movable into and out of operative position, manual means for moving the gage into position over the support to locate a shoe thereon and then causing operation of the grippers, and means for moving the gage out of operative position after the grippers have operated.

58. In a machine for working uppers over lasts, the combination of a support to receive the forepart of a sole upon a last bottom, power-operated grippers arranged to seize and tension the upper heightwise of the last, end-embracing wipers arranged for manual movement into and out of operative position over the shoe, said wipers being arranged when in operative position to move heightwise of the shoe and to advance and close, power means for so operating the wipers, a V-shaped gage arranged to be moved into and out of position to locate the shoe longitudinally and laterally on the support, manual means for moving the gage into operative position and causing the machine to operate the grippers and to stop, and other manual means for moving the gage out of operative position and for then causing the machine to operate the wipers and stop.

59. In a machine for working uppers over lasts, the combination of a support to receive the forepart of a sole upon a last bottom, power-operated grippers arranged to seize and tension the upper heightwise of the last, an abutment for the rear end of the shoe, means for urging the abutment toward the shoe, means for restraining the abutment from movement toward the shoe, and manual means for releasing the abutment and causing power operation of the grippers.

60. In a machine for working uppers over lasts, the combination of a support to receive the forepart of a sole upon a last bottom, power-operated grippers arranged to seize and tension the upper heightwise of the last, end-embracing wipers arranged to advance and close to work the upper under the last bottom, an abutment for the rear end of the shoe, means for bringing the abutment into contact with the shoe prior to the operation of the wipers, and means operated by the wipers for urging the abutment hard against the shoe during the advancing and closing movement of the wipers.

61. In a machine for working uppers over lasts, the combination of a support to receive the forepart of a sole upon a last bottom, grippers arranged to seize and tension the upper heightwise of the last, end-embracing wipers arranged to advance and close to work the upper under the last bottom, a gage movable into and out of position to locate the shoe on the support, an abutment for the rear end of the shoe, means for moving the gage into operative position prior to operation of the grippers, and means for moving the abutment against the shoe prior to the operation of the wipers.

62. In a machine for working uppers over lasts, the combination of a shoe support, means for working an upper over a last, an abutment slide movable longitudinally of the shoe, an abutment on the slide to engage the rear end of the shoe, a rack on the slide, a double-ended pawl, means for causing one end of the pawl first to engage the rack to prevent movement of the abutment toward the shoe and then causing the other end of the pawl to engage the rack to prevent movement of the abutment away from the shoe.

63. In a machine for working uppers over lasts, the combination of a support to receive the forepart of a shoe upon a last bottom, end-embracing wipers arranged to advance and close to work the upper under the last bottom, an abutment engaging the rear end of the shoe to hold it against advancing movement of the wipers, and an upright to which the abutment is secured for adjustment heightwise of the shoe, the upright being mounted to swing from side to side about an axis at its lower end and having a tooth to engage a fixed rack, pressure of the abutment against the shoe tending to hold the tooth against the rack.

64. In a machine for working uppers over lasts, the combination with a support to receive the forepart of a sole upon a last bottom, of power-operated grippers arranged to seize and tension the upper heightwise of the last, power-operated wipers arranged to wipe the upper heightwise of the last, and means for operating the machine in a three-step cycle, the grippers being operated in the first step of the cycle, the wipers in the second step, and the parts being restored to initial position in the third step.

65. In a machine for working uppers over lasts, the combination with a support to receive the forepart of a shoe sole upon a last bottom, of power-operated grippers arranged to seize and tension the upper heightwise of the last, end-embracing wipers arranged for manual movement into and out of operative position over the shoe, said wipers being arranged when in operative position to move heightwise of the shoe and to advance and close, power-operated means for so operating the wipers, means for stopping the machine after the grippers have operated, means for stopping the machine again after the wipers have operated, means for stopping the machine after the parts have been restored to operative position, and means for omitting the second stop in case the wipers have not been moved into operative position.

66. In a machine for working upper over lasts, the combination of a support to receive the forepart of a sole upon a last bottom, power-operated grippers arranged to seize and tension the upper heightwise of the last, end-embracing wipers arranged for manual movement into and out of operative position over the shoe, said wipers being arranged when in operative position to move heightwise of the shoe and to advance and close, power-operated means for so operating the wipers, means for causing the machine to operate the grippers and stop, means for then causing the machine to operate the wipers and stop, means for causing the machine to restore the parts to initial position, and means operative only when the wipers are in their inoperative position for causing the parts to be restored to their initial position after the grippers have been operated and the machine started the second time.

FRED RICKS.
HUBERT BOOTHROYD.
CYRIL HARRY JAMES.

CERTIFICATE OF CORRECTION.

Patent No. 2,152,855. April 4, 1939.

FRED RICKS, ET AL.

It is hereby certified that error appears in the printed specification of the above numbered patent requiring correction as follows: Page 3, first column, line 41, for "on its" read on it; same page, second column, line 39, for "postion" read position; page 7, second column, line 44, for "with" read which; page 8, second column, line 1, for "and gaging" read end gaging; line 13, for "no" read so; line 32, for "box 257" read box 357; page 14, second column, line 66, for the word "starch" read start; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.